United States Patent
Manolakos et al.

(10) Patent No.: US 11,678,279 B2
(45) Date of Patent: Jun. 13, 2023

(54) TIMING ACCURACY FOR REFERENCE SIGNAL TRANSMISSION DURING USER EQUIPMENT (UE) POWER SAVING STATE

(71) Applicant: QUALCOMM Incorporated, San Diego, CA (US)

(72) Inventors: Alexandros Manolakos, Escondido, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 250 days.

(21) Appl. No.: 17/332,841

(22) Filed: May 27, 2021

(65) Prior Publication Data

US 2021/0385766 A1    Dec. 9, 2021

Related U.S. Application Data

(60) Provisional application No. 63/039,265, filed on Jun. 15, 2020, provisional application No. 63/034,731, filed on Jun. 4, 2020.

(51) Int. Cl.
H04W 56/00 (2009.01)
H04L 25/02 (2006.01)
(Continued)

(52) U.S. Cl.
CPC ......... *H04W 56/001* (2013.01); *H04L 5/0051* (2013.01); *H04L 25/0226* (2013.01);
(Continued)

(58) Field of Classification Search
None
See application file for complete search history.

(56) References Cited

U.S. PATENT DOCUMENTS 11,611,952 B2 * 3/2023 MolavianJazi ..... H04W 52/367
2011/0292866 A1 * 12/2011 Zheng ............... H04W 52/0225
370/315
(Continued)

FOREIGN PATENT DOCUMENTS

WO  WO-2020089880 A1 * 5/2020 ......... H04L 41/0803
WO  WO 2020092715        5/2020

OTHER PUBLICATIONS

International Search Report and Written Opinion—PCT/US2021/034969—ISA/EPO—dated Oct. 5, 2021.
(Continued)

*Primary Examiner* — Otis L Thompson, Jr.
(74) *Attorney, Agent, or Firm* — Weaver Austin Villeneuve & Sampson LLP

(57) ABSTRACT

Methods, systems, computer-readable media, and apparatuses for UE positioning are described. In some embodiments, a UE is configured to transmit a reference signal to a network resource for performing measurements on the reference signal and deriving the position of the UE. The timing of the reference signal is tracked at a particular precision. The precision is based on a timing accuracy that the UE can support from different timing accuracies. The different timing accuracies may be supported, each of which may have a different set of timing error limits. For example, for an angular-based positioning of the UE, a low timing accuracy may be supported. In comparison, for a timing-based positioning method, a high timing accuracy may be supported.

51 Claims, 12 Drawing Sheets

(51) Int. Cl.
*H04L 5/00* (2006.01)
*H04W 76/28* (2018.01)
*H04W 8/24* (2009.01)
*H04W 76/27* (2018.01)
*H04W 52/02* (2009.01)

(52) U.S. Cl.
CPC ......... *H04W 8/24* (2013.01); *H04W 52/0274* (2013.01); *H04W 76/27* (2018.02); *H04W 76/28* (2018.02)

(56) References Cited

U.S. PATENT DOCUMENTS

| | | | | |
|---|---|---|---|---|
| 2016/0097835 | A1* | 4/2016 | Zhang | H04L 5/0053 370/329 |
| 2018/0092063 | A1* | 3/2018 | Azarian Yazdi | H04W 68/10 |
| 2018/0317107 | A1* | 11/2018 | Do | H04W 24/10 |
| 2019/0182794 | A1* | 6/2019 | Wong | H04W 52/0216 |
| 2021/0072340 | A1* | 3/2021 | Wang | H04L 5/0051 |
| 2022/0086794 | A1* | 3/2022 | Lee | G01S 1/0428 |
| 2022/0167301 | A1* | 5/2022 | Goyal | G01S 5/0236 |
| 2022/0224498 | A1* | 7/2022 | Cha | H04W 76/28 |
| 2022/0322325 | A1* | 10/2022 | Svedman | H04W 72/046 |
| 2023/0069404 | A1* | 3/2023 | Kittichokechai | H04W 72/52 |
| 2023/0079232 | A1* | 3/2023 | Keating | H04W 64/003 |
| 2023/0093234 | A1* | 3/2023 | Hao | H04W 24/10 |

OTHER PUBLICATIONS

VIVO: "Views on NR DL&UL Positioning Techniques", 3GPP Draft, 3GPP TSG RAN WG1#96 Meeting, R1-1901716 Views on NR DL&UL Positioning Techniques, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019 Feb. 16, 2019 (Feb. 16, 2019), XP051599412, 5 Pages, Retrieved from the Internet: URL:http://www.3gpp.org/ftp/tsg%5Fran/WG1%5FRL1/TSGR1%5F96/Docs/R1%2D1901716%2Ezip [retrieved on Feb. 16, 2019] pp. 2,4.

* cited by examiner

TIMING ACCURACY FOR REFERENCE SIGNAL TRANSMISSION DURING USER EQUIPMENT (UE) POWER SAVING STATE

RELATED APPLICATIONS

This application claims the benefit of U.S. Provisional Application No. 63/034,731, filed Jun. 4, 2020, entitled "TIMING ACCURACY FOR REFERENCE SIGNAL TRANSMISSION DURING USER EQUIPMENT (UE) POWER SAVING STATE", and claims the benefit of U.S. Provisional Application No. 63/039,265, filed Jun. 15, 2020, entitled "TIMING ACCURACY FOR REFERENCE SIGNAL TRANSMISSION DURING USER EQUIPMENT (UE) POWER SAVING STATE", both of which are assigned to the assignee hereof, and incorporated by reference herein in their entirety.

BACKGROUND

1. Field of Disclosure

Aspects of the disclosure generally relate to the field of wireless communications, and more specifically to timing accuracy of a reference signal that is used to determine a position of user equipment (UE) and that is transmitted during a power saving state of the UE.

2. Description of Related Art

In a data communication network, such as a Fifth Generation New Radio (5G NR, also referred to herein as "NR", having requirements defined by the $3^{rd}$ Generation Partnership Project (3GPP)), positioning techniques can be used to determine the location of a mobile electronic device (referred to herein as a UE)). The UE may use wireless radio frequency (RF) signaling between the UE and transmission and reception points (TRPs) (e.g., base stations) of the data communication network to perform measurements for positioning and/or communicate those measurements to the data communication network.

Different methods are available to perform positioning measurements. Such methods and measurements can be based on downlink signals, uplink signals, or both. These signals, such as sounding reference signals (SRS) for positioning and positioning reference signals (PRS) are defined in 3GPP specifications, and enable accurate positioning measurements by the UE and one or more base stations (e.g., the serving cell and/or one or more neighboring cells). The UE positioning can also use measurements other than SRS and PRS-based ones. For example, synchronization signal block (SSB) and channel state information reference signal (CSI-RS) for radio resources management (RRM)-based measurements can be used in E-CID methods.

BRIEF SUMMARY

Methods, systems, computer-readable media, and apparatuses for UE positioning are described. In some embodiments, a UE is configured to transmit a reference signal to a network resource for performing measurements on the reference signal and deriving the position of the UE. The timing of the reference signal is tracked at a particular precision. The precision is based on a timing accuracy that the UE can support from different timing accuracies. The different timing accuracies may be supported, each of which may have a different set of timing error limits. For example, for an angular-based positioning of the UE, a low timing accuracy may be supported. In comparison, for a timing-based positioning method, a high timing accuracy may be supported.

An example method for transmitting a reference signal for positioning a user equipment (UE) in a power saving state corresponding to a discontinuous reception (DRX), radio resource control (RRC)-idle, or RRC-inactive state, according to this disclosure, comprises entering into the power saving state by the UE. The method also comprises determining, at the UE, a timing accuracy associated with a transmission timing of the reference signal during the power saving state of the UE, the timing accuracy determined from a plurality of timing accuracies based on a positioning method, a type of positioning measurements to be determined from the reference signal, or a configuration received by a network resource, or a combination thereof. The method also comprises determining, at the UE, during the power saving state, the transmission timing based on the timing accuracy. The method also comprises transmitting, by the UE during the power saving state, the reference signal based on the transmission timing.

An example method for supporting positioning a user equipment (UE) in a power state corresponding to a discontinuous reception (DRX), radio resource control (RRC)-idle, or RRC-inactive state by a network resource, according to this disclosure, comprises receiving, at the network resource, a reference signal for positioning the UE, the reference signal transmitted by the UE while the UE is in the power saving state determining, at the network resource, a timing accuracy associated with the reference signal, the timing accuracy determined from a plurality of timing accuracies based on: a positioning method, a type of positioning measurements to be determined from the reference signal, or a configuration received by the network resource, or a combination thereof. The method also comprises performing, by the network resource, a positioning measurement on the reference signal based on the timing accuracy.

An example user equipment (UE) for transmitting a reference signal for positioning the UE in a power saving state corresponding to a discontinuous reception (DRX), radio resource control (RRC)-idle, or RRC-inactive state, according to this disclosure, comprises a transceiver, a memory, and one or more processors communicatively coupled with the transceiver and the memory. The one or more processing units are configured to enter the UE into the power saving state and determine a timing accuracy associated with a transmission timing of the reference signal during the power saving state of the UE, the timing accuracy determined from a plurality of timing accuracies based on: a positioning method. a type of positioning measurements to be determined from the reference signal, a configuration received by a network resource, or a combination thereof. The one or more processing units are further configured to determine, at the UE, during the power saving state, the transmission timing based on the timing accuracy. The one or more processing units are further configured to transmit, via the transceiver, the reference signal based on the transmission timing.

An example network resource for supporting positioning a user equipment (UE) in a power state corresponding to a discontinuous reception (DRX), radio resource control (RRC)-idle, or RRC-inactive state, according to this disclosure, comprises a transceiver, a memory, and one or more processors communicatively coupled with the transceiver and the memory, wherein the one or more processors are configured to receive, at the network resource, a reference signal for positioning the UE, the reference signal transmitted by the UE while the UE is in the power saving state. The one or more processing units are further configured to determine, at the network resource, a timing accuracy associated with the reference signal, the timing accuracy determined from a plurality of timing accuracies based on: a positioning method, a type of positioning measurements to be determined from the reference signal, a configuration received by the network resource, or a combination thereof. The one or more processing units are further configured to perform a positioning measurement on the reference signal based on the timing accuracy.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Aspects of the disclosure are illustrated by way of example. In the accompanying figures, like reference numbers indicate similar elements.

DETAILED DESCRIPTION

Figure 1:
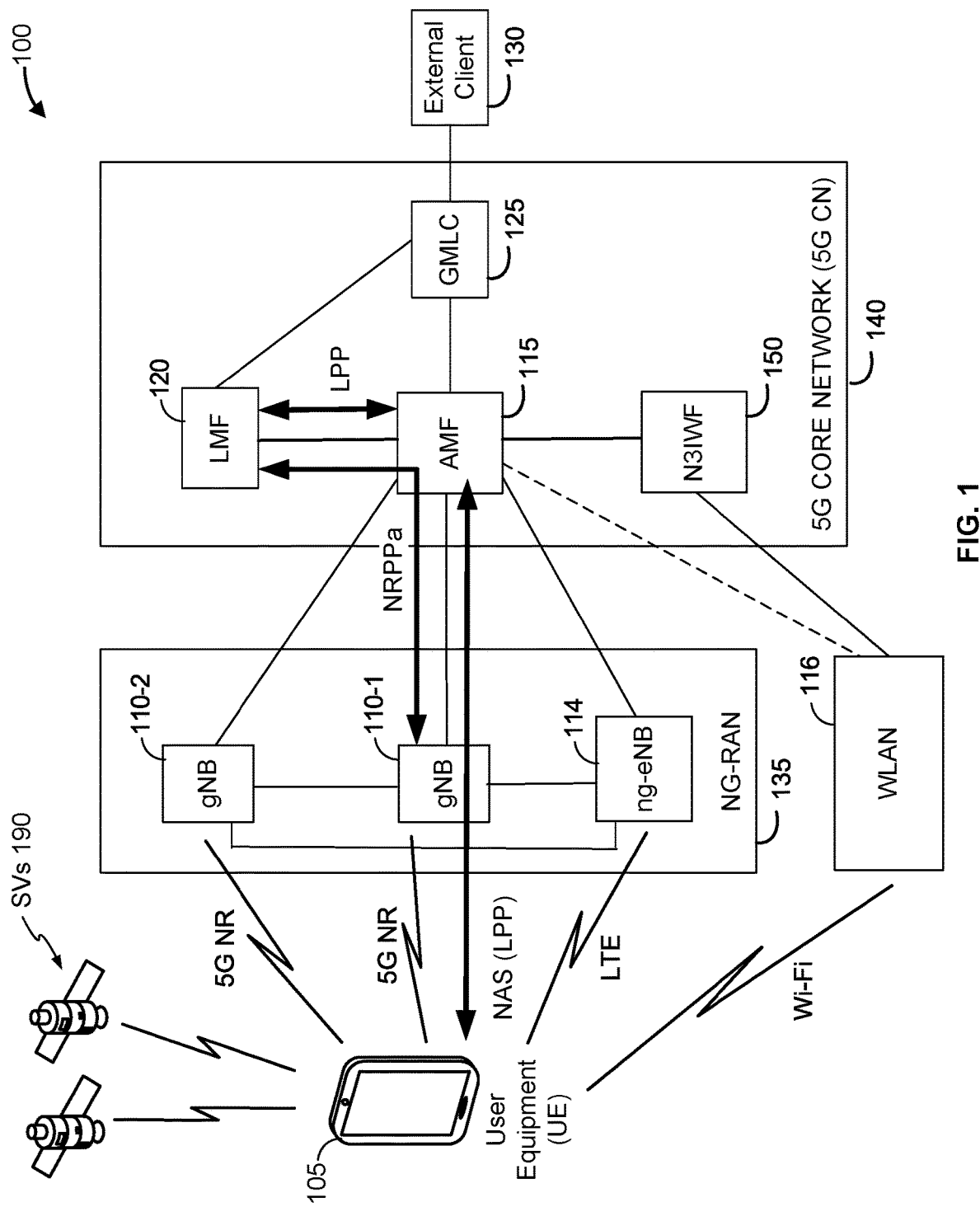
FIG. 1 illustrates an example of a diagram of a communication system, in accordance with at least one embodiment.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure.

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

Additionally, references to "reference signals," "positioning reference signals," "reference signals for positioning," and the like may be used to refer to signals used for positioning of a user equipment (UE). As described in more detail herein, such signals may comprise any of a variety of signal types but may not necessarily be limited to a Positioning Reference Signal (PRS) or Sounding Reference Signal (SRS) as defined in relevant wireless standards.

As previously noted, different methods are available to perform positioning measurements. Some of the positioning methods are based on downlink signals and include downlink time difference of arrival (DL-TDOA) measurements and downlink angle of departure (DL-AoD) measurements. Other positioning methods are based on uplink signals and include uplink time difference of arrival (UL-TDOA) measurements and uplink angle of arrival (UL-AoA) measurements. Yet other positioning methods include measurements related to both downlink signals and uplink signals, such as round-trip time (RTT) with one or more neighboring base stations. In addition, each of the base stations can be associated with an identifier (ID) of a cell that is covered by the base station. Positioning of the UE can involve radio resource management (RRM) measurements that use enhanced cell identifiers (E-CID).

To help with the UE positioning, sounding reference signals (SRS) for positioning, also referred to positioning reference signals (PRS) in release 16 of the 3GPP specifications, are defined and enable the UE to detect and measure more neighboring base stations. For example, base stations send PRS to the UE to improve observed time of arrival (OTDOA) in DL-TDOA measurements. The OTDOA of the PRS from a reference cell station (e.g., the serving cell) and one or more neighboring cells is known as the downlink (DL) reference signal time difference (RSTD). Using the DL RSTD measurements, the absolute or relative transmission timing of each cell, and the known position(s) of base station transmitting antenna element(s) for the reference and neighboring cells, the UE's position may be determined.

Other SRS and PRS-based measurements are also possible. For example, downlink PRS can be used for downlink (DL). PRS reference signal received power (RSRP) measurements in support of DL-TDOA, DL-AoD, or multi-RTT. SRS for positioning can be used for UE reception-transmission (Rx-Tx) time different measurements in support of multi-RTT.

The UE positioning can also use measurements other than SRS and PRS-based ones. For example, synchronization signal block (SSB) and channel state information reference signal (CSI-RS) for radio resources management (RRM)-based measurements can be used in E-CID methods.

Embodiments of the present disclosure are directed to, among other things, transmitting a reference signal for positioning of a UE while the UE is in a power saving state, which may correspond to a discontinuous reception (DRX)-inactive state, a radio resource control (RRC)-idle state, or an RRC-inactive state, for example. In an example, the UE, while in the power saving state, sends to a network resource (e.g., to a base station, to a location server via the base station, to another UE via a sidelink) the reference signal. The network resource (which is also referred to herein as a "network entity") determines the position of the UE by performing measurements on the reference signal according to one or more positioning methods. To achieve a targeted positioning accuracy, some of the positioning methods may necessitate higher timing accuracy than other positioning methods. Generally, a higher timing accuracy may necessitate the UE to maintain a relatively higher number of components active during the power saving state to allow the UE to more precisely track the timing for transmitting the reference signal. Thus, to support a higher timing accuracy during the power saving state, the UE's power consumption may be higher relative to the UE's support of a lower timing accuracy. Dependent on the timing accuracy that the UE is to support, the UE can more precisely or less precisely, as applicable, track the timing for transmitting the reference signal, thereby optimizing its power consumption during the power saving mode in support of the timing accuracy. Additionally, the network resource can determine a timing error requirement dependently on the UE supported timing accuracy and use the timing error requirement in performing measurements on the reference signal.

To illustrate, consider an example of DRX. When the UE is in a DRX-inactive state, the UE may transmit an SRS for positioning to the network resource. The network resource may perform an angular positioning method (e.g., UL-AoA) or a timing positioning method (e.g., UL-TDOA or RTT) to determine the UE position based on measurements on the SRS signal. If the angular positioning method is used, supporting a high-timing accuracy may be wasteful because supporting, instead, a low-timing accuracy may achieve the same or similar positioning accuracy. However, if the timing positioning method is used, supporting a high-timing accuracy may be beneficial to achieve the positioning accuracy. Hence, in this illustrative example, the UE may signal to the network resource its capability to support the high-timing accuracy and the low-timing accuracy. The network resource may send configuration information to the UE indicating the timing accuracy to be used (e.g., high or low). If the high-timing accuracy is to be used, the UE may set the frequency of its clock to a high frequency (e.g., in the GHz range) and may maintain a radio frequency (RF) receiver active to receive a downlink timing signal to track downlink drift. In this way, the UE can track the timing for transmitting the SRS signal at a high precision. In comparison, if the low-timing accuracy is to be used, the UE may set the frequency of its clock to a low frequency (e.g., in the MHz range) and may deactivate the RF receiver (e.g., power off). Upon receiving the SRS signal, the network resource may determine the timing error requirement associated with the positioning method (e.g., a lower timing error requirement for the timing positioning method, and a larger timing error requirement for the angular positioning method) and may perform positioning measurements on the SRS signal accordingly.

In the interest of clarity of explanation, embodiments of the present disclosure are described in connection with an SRS for positioning signal, referred to herein as an SRS signal for brevity. The embodiments are also described in connection with a DRX-inactive state. However, as previously noted, the embodiments are not limited as such and similarly apply to other types of reference signals that a UE may transmit and a network resource may process to determine a position of the UE. In addition, the embodiments similarly apply to other types of a power saving state, such as to RRC-idle or RRC-inactive, during which the UE's power consumption is reduced by reducing the transmission and/or reception functionality of the UE. Herein also, the terms "location" and "position" are used interchangeably.

FIG. 1 is a diagram of a communication system 100, in which the techniques disclosed herein for reference signal transmission may be used, according to an embodiment. The communication system 100 may be configured to determine the location of a UE 105 by using access nodes 110, 114, 116 and (optionally) a location server (LMF 120) to implement one or more positioning methods. The term "access node," as used in the embodiments described herein below, is meant to refer to network nodes providing access to the communication system 100. Access nodes may therefore include, but are not necessarily limited to, a gNB 110, ng-eNB 114 or WLAN 116. Here, the communication system 100 comprises a UE 105, and components of a 5G network comprising a Next Generation (NG) Radio Access Network (RAN) (or "NG-RAN") 135 and a 5G Core Network (5G CN) 140. A 5G network may also be referred to as an NR network, NG-RAN 135 may be referred to as a 5G RAN or as an NR RAN, and 5G CN 140 may be referred to as an NG Core network. Standardization of an NG-RAN and 5G CN is ongoing in the 3$^{rd}$ Generation Partnership Project (3GPP).

Accordingly, NG-RAN 135 and 5G CN 140 may conform to current or future standards for 5G support from 3GPP. The communication system 100 may further utilize information from space vehicles (SVs) 190 for a Global Navigation Satellite System (GNSS) like Global Positioning System (GPS), GLONASS, Galileo or Beidou, or some other local or regional Satellite Positioning System (SPS) such as Indian Regional Navigational Satellite System (IRNSS), European Geostationary Navigation Overlay Service (EGNOS), or Wide Area Augmentation System (WAAS). Additional components of the communication system 100 are described below. The communication system 100 may include additional or alternative components.

It should be noted that FIG. 1 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions) may utilize the communication system 100. Similarly, the communication system 100 may include a larger (or smaller) number of SVs 190, gNBs 110, ng-eNBs 114, Wireless Local Area Networks (WLANs) 116, Access and Mobility Functions (AMF)s 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), tracking device, navigation device, Internet of Things (IoT) device, or some other portable or moveable device. Typically, though not necessarily, the UE 105 may support wireless communication using one or more Radio Access Technologies (RATs) such as using Global System for Mobile Communications (GSM), Code Division Multiple Access (CDMA), Wideband CDMA (WCDMA), Long-Term Evolution (LTE), High Rate Packet Data (HRPD), IEEE 802.11 Wi-Fi®, Bluetooth, Worldwide Interoperability for Microwave Access (WiMAX™), 5G NR (e.g., using the NG-RAN 135 and 5G CN 140), etc. The UE 105 may also support wireless communication using a WLAN 116 which (like the one or more RATs) may connect to other networks, such as the Internet. The use of one or more of these RATs may allow the UE 105 to communicate with an external client 130 (e.g., via elements of 5G CN 140 not shown in FIG. 1, or possibly via a Gateway Mobile Location Center (GMLC) 125) and/or allow the external client 130 to receive location information regarding the UE 105 (e.g., via the GMLC 125).

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g., for latitude, longitude, and altitude above or below mean sea level).

Base stations (BSs) in the NG-RAN 135 shown in FIG. 1 may comprise a Transmission Reception Point (TRP), such as a NR NodeB (gNB) 110-1 and 110-2 (collectively and generically referred to herein as gNBs 110) and/or an antenna of a gNB. Pairs of gNBs 110 in NG-RAN 135 may be connected to one another (e.g., directly as shown in FIG. 1 or indirectly via other gNBs 110). Access to the 5G network is provided to UE 105 via wireless communication between the UE 105 and one or more of the gNBs 110, which may provide wireless communications access to the 5G CN 140, on behalf of the UE 105 using 5G NR. 5G NR radio access may also be referred to as NR radio access or as 5G radio access. In FIG. 1, the serving gNB for UE 105 is assumed to be gNB 110-1, although other gNBs (e.g., gNB 110-2) may act as a serving gNB if UE 105 moves to another location or may act as a secondary gNB to provide additional throughput and bandwidth to UE 105.

BSs in the NG-RAN 135 shown in FIG. 1 may also or instead include a next generation evolved Node B, also referred to as an ng-eNB, 114. Ng-eNB 114 may be connected to one or more gNBs 110 in NG-RAN 135 (e.g., directly or indirectly via other gNBs 110 and/or other ng-eNBs). An ng-eNB 114 may provide LTE wireless access and/or evolved LTE (eLTE) wireless access to UE 105. Some gNBs 110 (e.g., gNB 110-2) and/or ng-eNB 114 in FIG. 1 may be configured to function as positioning-only beacons which may transmit signals (e.g., DL-PRS signals) and/or may broadcast assistance data to assist positioning of UE 105 but may not receive signals from UE 105 or from other UEs. It is noted that while only one ng-eNB 114 is shown in FIG. 1, some embodiments may include multiple ng-eNBs 114. Base stations 210, 214 may communicate directly with one another via an Xn communication interface. Additionally or alternatively, base stations 210, 214 may communicate directly or indirectly with other components of the communication system 100, such as the LMF 120 and AMF 115.

Communication system 100 may also include one or more WLANs 116 which may connect to a Non-3GPP InterWorking Function (N3IWF) 150 in the 5G CN 140 (e.g., in the case of an untrusted WLAN 116). For example, the WLAN 116 may support IEEE 802.11 Wi-Fi access for UE 105 and may comprise one or more Wi-Fi access points (APs). Here, the N3IWF 150 may connect to other elements in the 5G CN 140 such as AMF 115. In some embodiments, WLAN 116 may support another RAT such as Bluetooth. The N3IWF 150 may provide support for secure access by UE 105 to other elements in 5G CN 140 and/or may support interworking of one or more protocols used by WLAN 116 and UE 105 to one or more protocols used by other elements of 5G CN 140 such as AMF 115. For example, N3IWF 150 may support IPsec tunnel establishment with UE 105, termination of IKEv2/IPsec protocols with UE 105, termination of N2 and N3 interfaces to 5G CN 140 for control plane and user plane, respectively, relaying of uplink and downlink control plane Non-Access Stratum (NAS) signaling between UE 105 and AMF 115 across an N1 interface. In some other embodiments, WLAN 116 may connect directly to elements in 5G CN 140 (e.g., AMF 115 as shown by the dashed line in FIG. 1) and not via N3IWF 150 (e.g., if WLAN 116 is a trusted WLAN for 5G CN 140). For example, direct connection of WLAN 116 to SGCN 140 may occur if WLAN 116 is a trusted WLAN for SGCN 140 and may be enabled using a Trusted WLAN Interworking Function (TWIF) (not shown in FIG. 1) which may be an element inside WLAN 116. It is noted that while only one WLAN 116 is shown in FIG. 1, some embodiments may include multiple WLANs 116.

Access nodes may comprise any of a variety of network entities enabling communication between the UE 105 and the AMF 115. This can include gNBs 110, ng-eNB 114, WLAN 116, and/or other types of cellular BSs. However, access nodes providing the functionality described herein may additionally or alternatively include entities enabling communications to any of a variety of RATs not illustrated in FIG. 1, which may include non-cellular technologies.

In some embodiments, an access node, such as a gNB 110, ng-eNB 114, or WLAN 116 (alone or in combination with other modules/units of the communication system 100), may be configured to, in response to receiving a request for location information for multiple RATs from the LMF 120, take measurements for one of the multiple RATs (e.g., measurements of the UE 105) and/or obtain measurements from the UE 105 that are transferred to the access node using one or more of the multiple RATs. As noted, while FIG. 1 depicts access nodes 110, 114, and 116 configured to communicate according to 5G NR, LTE and Wi-Fi communication protocols, respectively, access nodes configured to communicate according to other communication protocols may be used, such as, for example, a Node B using a WCDMA protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise BSs comprising eNBs supporting LTE wireless access. A core network for EPS may comprise an Evolved Packet Core (EPC). An EPS may then comprise an E-UTRAN plus an EPC, where the E-UTRAN corresponds to NG-RAN 135 and the EPC corresponds to 5G CN 140 in FIG. 1. The methods and techniques described herein for UE 105 positioning using common or generic positioning procedures may be applicable to such other networks.

The gNBs 110 and ng-eNB 114 can communicate with an AMF 115, which, for positioning functionality, communicates with an LMF 120. The AMF 115 may support mobility of the UE 105, including cell change and handover of UE 105 from an access node 110, 114, or 116 of a first RAT to an access node 110, 114, or 116 of a second RAT. The AMF 115 may also participate in supporting a signaling connection to the UE 105 and possibly data and voice bearers for the UE 105. The LMF 120 may support positioning of the UE 105 when the UE 105 accesses the NG-RAN 135 or WLAN 116 and may support position procedures and methods, including UE-assisted/UE-based and/or network-based procedures/methods, such as Assisted GNSS (A-GNSS), Observed Time Difference Of Arrival (OTDOA) (which may be referred to in NR as DL Time Difference Of Arrival (DL-TDOA)), Round-Trip Timing (RTT), Real Time Kinematics (RTK), Precise Point Positioning (PPP), Differential GNSS (DGNSS), Enhanced Cell ID (ECID), angle of arrival (AOA), angle of departure (AOD), WLAN positioning, and/or other positioning procedures and methods. The LMF 120 may also process location services requests for the UE 105 (e.g., received from the AMF 115 or from the GMLC 125). The LMF 120 may be connected to AMF 115 and/or to GMLC 125. The LMF 120 may be referred to by other names such as a Location Manager (LM), Location Function (LF), commercial LMF (CLMF), or value added LMF (VLMF). In some embodiments, a node/system that implements the LMF 120 may additionally or alternatively implement other types of location-support modules, such as an Evolved Serving Mobile Location Center (E-SMLC) or Service Location Protocol (SLP). It is noted that in some embodiments, at least part of the positioning functionality (including determination of a UE's location) may be performed at the UE 105 (e.g., by processing DL-PRS signals transmitted by wireless nodes such as gNBs 110, ng-eNB 114, and/or WLAN 116, and/or using assistance data provided to the UE 105 (e.g., by LMF 120)).

The GMLC 125 may support a location request for the UE 105 received from an external client 130 and may forward such a location request to the AMF 115 for forwarding by the AMF 115 to the LMF 120, or may forward the location request directly to the LMF 120. A location response from the LMF 120 (e.g., containing a location estimate for the UE 105) may be similarly returned to the GMLC 125 either directly or via the AMF 115, and the GMLC 125 may then return the location response (e.g., containing the location estimate) to the external client 130. The GMLC 125 is shown connected to both the AMF 115 and LMF 120 in FIG. 1 though only one of these connections may be supported by 5G CN 140 in some implementations.

As further illustrated in FIG. 1, the LMF 120 may communicate with the gNBs 110 and/or with the ng-eNB 114 using an NR Positioning Protocol A (NRPPa) as defined in 3GPP Technical Specification (TS) 38.445. As further illustrated in FIG. 1, LMF 120 and UE 105 may communicate using an LTE Positioning Protocol (LPP) as defined in 3GPP TS 37.355. Here, LPP messages may be transferred between the UE 105 and the LMF 120 via the AMF 115 and a serving gNB 110-1 or serving ng-eNB 114 for UE 105. For example, LPP messages may be transferred between the LMF 120 and the AMF 115 using messages for service based operations (e.g., based on the Hypertext Transfer Protocol (HTTP)) and may be transferred between the AMF 115 and the UE 105 using a 5G NAS protocol. The LPP protocol may be used to support positioning of UE 105 using UE-assisted and/or UE-based position methods such as A-GNSS, RTK, OTDOA, multi-cell RTT, AOD, and/or ECID. The NRPPa protocol may be used to support positioning of UE 105 using network-based position methods such as, AOA, uplink TDOA (UL-TDOA) and/or may be used by LMF 220 to obtain location related information from gNBs 210 and/or ng-eNB 214, such as parameters defining DL-PRS transmission from gNBs 110 and/or ng-eNB 114.

In the case of UE 105 access to WLAN 116, LMF 120 may use LPPa and/or LPP to obtain a location of UE 105 in a similar manner to that just described for UE 105 access to a gNB 110 or ng-eNB 114. Thus, LPPa messages may be transferred between a WLAN 116 and the LMF 120, via the AMF 115 and N3IWF 150 to support network-based positioning of UE 105 and/or transfer of other location information from WLAN 116 to LMF 120. Alternatively, LPPa messages may be transferred between N3IWF 150 and the LMF 120, via the AMF 115, to support network-based positioning of UE 105 based on location related information and/or location measurements known to or accessible to N3IWF 150 and transferred from N3IWF 150 to LMF 120 using LPPa. Similarly, LPP and/or LPP messages may be transferred between the UE 105 and the LMF 120 via the AMF 115, N3IWF 150, and serving WLAN 116 for UE 105 to support UE assisted or UE based positioning of UE 105 by LMF 120.

In the communication system 100, positioning methods can be categorized as being "UE assisted" or "UE based." This may depend on where the request for determining the position of the UE 105 originated. If, for example, the request originated at the UE (e.g., from an application, or "app," executed by the UE), the positioning method may be categorized as being UE based. If, on the other hand, the request originates from an external client or AF 130, LMF 120, or other device or service within the 5G network, the positioning method may be categorized as being UE assisted (or "network-based").

With a UE-assisted position method, UE 105 may obtain location measurements and send the measurements to a location server (e.g., LMF 120) for computation of a location estimate for UE 105. In addition or as an alternative to the DL-PRS measurements and other position-related information previously described, the location measurements may include one or more of a Received Signal Strength Indication (RSSI), Round Trip signal propagation Time (RTT), Reference Signal Received Quality (RSRQ), Reference Signal Time Difference (RSTD), Time of Arrival (TOA), AOA, Receive Time-Transmission Time Difference (Rx-Tx), Differential AOA (DAOA), AOD, or Timing Advance (TA) for gNBs 110, ng-eNB 114, and/or one or more APs for WLAN 116. Additionally or alternatively, similar measurements may be made of sidelink signals transmitted by other UEs, which may serve as anchor points for positioning of the UE 105 if the positions of the other UEs are known. The location measurements may also or instead include measurements of RAT-independent positioning methods such as GNSS (e.g., GNSS pseudorange, GNSS code phase, and/or GNSS carrier phase for SVs 190), WLAN, etc.

With a UE-based position method, UE 105 may obtain location measurements (which may be the same as or similar to location measurements for a UE assisted position method) and may further compute a location of UE 105 (e.g., with the help of assistance data received from a location server such as LMF 120 or broadcast by gNBs 110, ng-eNB 114, or WLAN 116).

With a network-based position method, one or more BSs (e.g., gNBs 110 and/or ng-eNB 114), one or more APs (e.g., in WLAN 116), or N3IWF 150 may obtain location measurements (e.g., measurements of RSSI, RTT, RSRP, RSRQ, AOA, or TOA) for signals transmitted by UE 105, and/or may receive measurements obtained by UE 105 or by an AP in WLAN 116 in the case of N3IWF 150, and may send the measurements to a location server (e.g., LMF 120) for computation of a location estimate for UE 105.

Positioning of the UE 105 also may be categorized as UL, DL, or DL-UL based, depending on the types of signals used for positioning. If, for example, positioning is based solely on signals received at the UE 105 (e.g., from a base station or other UE), the positioning may be categorized as DL based. On the other hand, if positioning is based solely on signals transmitted by the UE 105 (which may be received by a base station or other UE, for example), the positioning may be categorized as UL based. Positioning that is DL-UL based includes positioning, such as RTT-based positioning, that is based on signals that are both transmitted and received by the UE 105.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for OTDOA, AOD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AOD and/or AOA.

Figure 2:
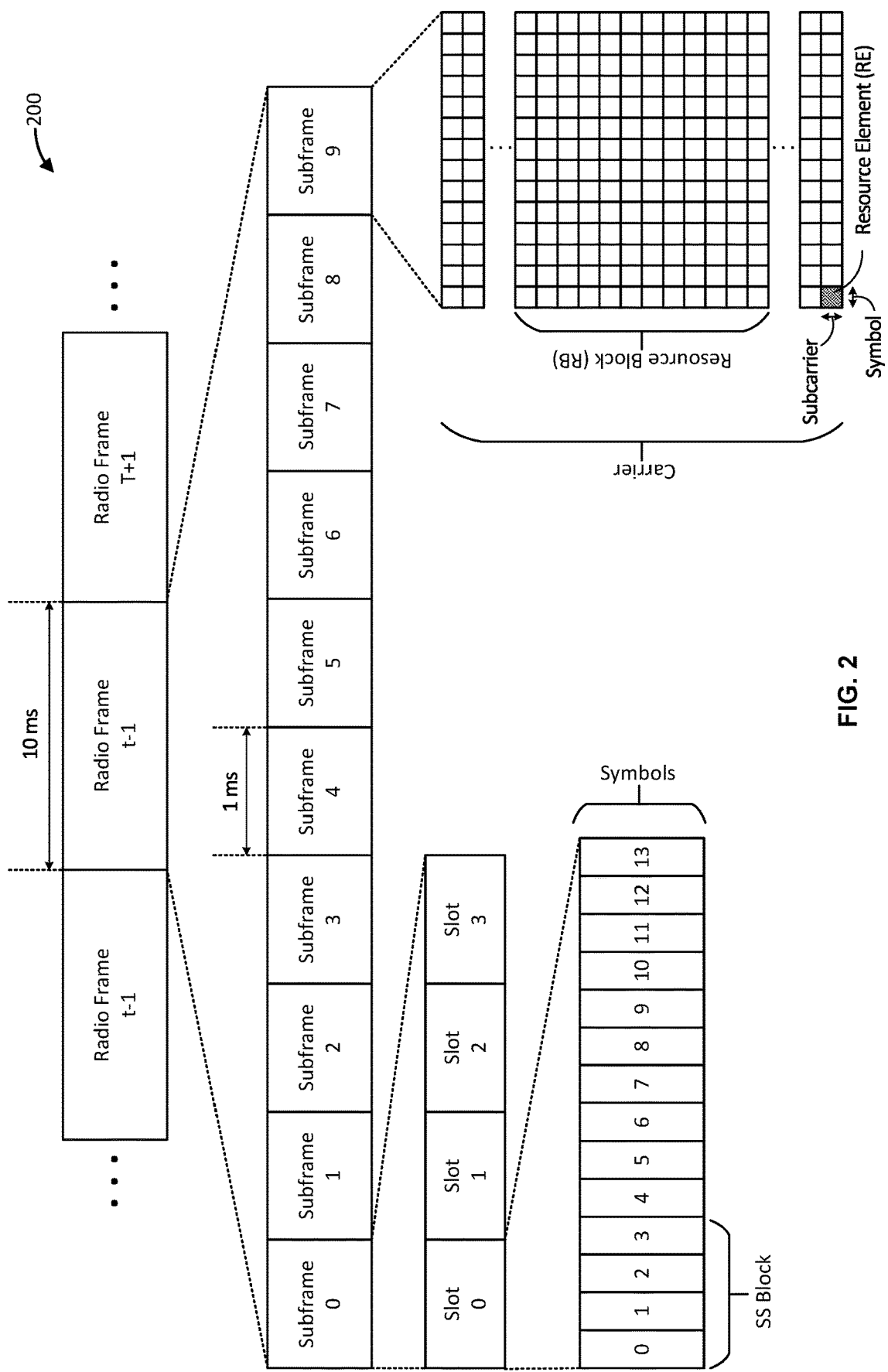
FIG. 2 illustrates an example of a frame structure usable by a communication system, in accordance with at least one embodiment.

FIG. 2 illustrates an example of a frame structure 200 usable by a communication system, such as the communication system 100, in accordance with at least one embodiment. The frame structure 200 can serve as the basis for physical layer communication between the UE 105 and serving gNB 110-1. The transmission timeline for each of the downlink and uplink may be partitioned into units of radio frames. Each radio frame may have a predetermined duration (e.g., ten milliseconds (ms)) and may be partitioned into ten subframes, each of one ms, with indices of "0" through "9." Each subframe may include a variable number of slots depending on the subcarrier spacing. Each slot may include a variable number of symbol periods (e.g., seven or fourteen symbols) depending on the subcarrier spacing. The symbol periods in each slot may be assigned indices. A mini-slot may comprise a sub slot structure (e.g., two, three, or four symbols). Additionally shown in FIG. 2 is the complete Orthogonal Frequency-Division Multiplexing (OFDM) of a subframe, showing how a subframe can be divided across both time and frequency into a plurality of Resource Blocks (RBs). A single RB can comprise a grid of Resource Elements (REs) spanning fourteen symbols and twelve subcarriers. Each RE is represented in FIG. 2 with a square.

A set of resource elements allocated for the transmission of an SRS signal. may be referred to as an SRS resource. In the uplink direction, SRS resources may be allocated (e.g., via a serving cell) to a UE for the transmission of SRS signals. In this way, the UE may know when (e.g., the slot number and the OFDM symbol number) to wake up, as applicable (e.g., if in a power saving state), and transmit SRS signals.

Each symbol in a slot may indicate a link direction (e.g., downlink (DL), uplink (UL), or flexible) or data transmission and the link direction for each subframe may be dynamically switched. The link directions may be based on the slot format. Each slot may include DL/UL data as well as DL/UL control information. In NR, a synchronization signal (SS) block is transmitted. The SS block includes a primary SS (PSS), a secondary SS (SSS), and a two symbol Physical Broadcast Channel (PBCH). The SS block can be transmitted in a fixed slot location, such as the symbols "0-3" as shown in FIG. 2. The PSS and SSS may be used by UEs for cell search and acquisition. The PSS may provide half-frame timing, the SS may provide the cyclic prefix (CP) length and frame timing. The PSS and SSS may provide the cell identity. The PBCH carries some basic system information, such as downlink system bandwidth, timing information within radio frame, SS burst set periodicity, system frame number, etc.

For a given frequency, the serving gNB 110-1 may configure the UE 105 by performing, among other things, Time Domain Division (TDD) resource designation using different layers to perform different functions. An "upper layer" or "higher layer" may comprise a layer of the serving base station 110-1 providing control information to the UE 105 via Radio Resource Control (RRC) protocol (e.g., an RRC layer). A higher layer may additionally include an application layer, Media Access Control (MAC) layer, or other layer capable of providing the UE 105 with information regarding designated resources for communications. Furthermore, the physical layer (or "lower layer") has a scheduler that can provide Downlink Control Information (DCI) information (e.g., transport format, resource allocation) to the UE 105 via the Physical Downlink Control Channel (PDCCH). The serving gNB 110-1 can, using RRC signaling, perform semi-static designation of time domain resource elements to implement cell-specific and/or UE-specific patterns. The physical layer, the serving gNB 110-1 can (using DCI in the PDCCH) perform a dynamic designation of time domain resources on a per-slot basis (e.g., having much finer granularity than RRC signaling) using a Slot Format Indicator (SFI) in the DCI.

The Physical Uplink Control Channel (PUCCH) is used to communicate Uplink Control Information (UCI) from the UE to the serving gNB 110-1. This UCI may comprise, for example, a Hybrid Automatic Repeat Request (HARQ) (e.g., a HARQ Acknowledgement (HARQ-ACK)), Channel State Information (CSI), and Scheduling Request (SR). In NR, PUCCH may be flexible in its time and frequency allocation, allowing for differently-capable UEs (e.g., UEs with smaller bandwidth capabilities) efficient usage of available resources. For NR, PUCCH resources can come in five different formats, including short formats (in which PUCCH resources span "1-2" symbols), and long formats (in which PUCCH resources can span "4-14" symbols).

Figure 3:
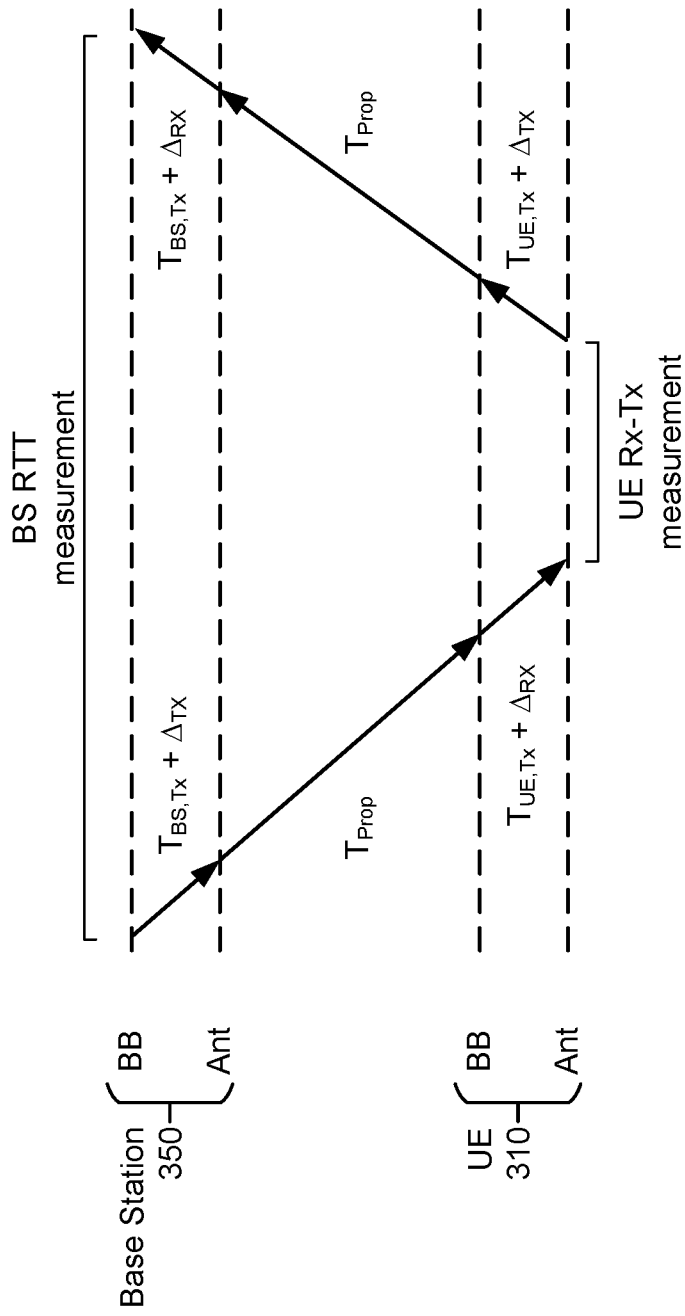
FIG. 3 illustrates an example of timing-based measurements for UE positioning, in accordance with at least one embodiment.

FIG. 3 illustrates an example of timing-based measurements for UE positioning, in accordance with at least one embodiment. As illustrated, a UE 310 (e.g., UE 105 of FIG. 1) receives and sends reference signals to a base station 350 (e.g., gNB 110 or ng-eNB 114 of FIG. 1). In turn, the base station 350 (or a location server integrated with or remote from the base station 350) performs a timing-based positioning method on the reference signals.

In an example, the timing-based positioning method may involve uplink and/or downlink reference signals. On the downlink, positioning reference signals (PRS) are transmitted from the base station 350 to the UE 310. These signals can be referred to as downlink PRS (DL-PRS). On the uplink, uplink PRS are transmitted from the UE 310 to the base station 350. These signals can be referred to as UL-PRS, SRS for positioning, or for brevity herein as SRS. An information element (IE) is configured for SRS in RRC signaling.

Generally, the base station 350 can perform measurements on the SRS according to one or more positioning methods, including timing-based and angle-based positioning method. For instance, SRS enables the base station 350 to perform uplink relative time of arrival (UL-RTOA) measurements in support of a UL-TDOA positioning method. SRS also enables the base station 350 to perform uplink SRS-RSRP measurements in support of any of a UL-TDOA positioning method, a UL-AoA positioning method, or a multi-RTT positioning method. Further, SRS enables the base station 350 to perform base station reception-transmission (Rx-Tx) time difference measurements in support of a multi-RTT positioning method. In addition, SRS enables the base station to perform AoA and zenith of arrival angle (ZoA) positioning method in support of any of a UL-AoA positioning method and a multi-RTT positioning method.

In release 15 of the 3GPP specifications, the UE 310 can transmit SRS based on Zadoff-Chu sequences, can be configured according to specific SRS allocation in support of transmission within an active bandwidth part (BWP), can periodically, semi-persistently, or aperiodically perform the transmission, can use the same timing advance (TA) as regular UL channels for the transmission, and can support group or sequence hopping. Newer releases of the 3GPP specifications introduce enhancements to the SRS. For instance, only open loop power control is supported, a path-loss reference can be a PRS or an SSB from a serving or neighboring cell or CSI-RS from a serving cell, a multi-symbol SRS resource is possible by being staggered in frequency, no frequency hopping is possible, the use of a single-port is supported, SRS is dropped in symbols where collision exists with PUSCH, SRS can be configured in any OFDM symbol of a slot, and spatial relation information can be a DL-PRS, an SSB from a serving or neighboring cell, CSI-RS from a serving cell, or another SRS.

As illustrated in FIG. 3, an RTT positioning method is used, although other positioning methods are possible as explained above. The RTT positioning method includes DL-PRS and UL-PRS (e.g., SRS). Measurements include path propagation times on the downlink and uplink (shown as "Tprop"). In addition, on the downlink, the measurement include in-device propagation times (e.g., between a baseband (BB) and an antenna on the transmit side of the base station 350, shown as "$T_{BS,Tx}$, $\Delta_{Tx}$", and between a BB and an antenna on the receive side of the UE 310, shown as "$T_{UE,Tx}$, $+\Delta_{Rx}$"). Similarly, on the uplink, the measurements further include in-device propagation times (e.g., between a BB and an antenna on the transmit side of the UE 310, shown as "$T_{UE,Tx}$, $\Delta_{Tx}$", and between a BB and an antenna on the receive side of the base station 350, shown as "$T_{BS,Tx}$, $+\Delta_{Rx}$").

Some elements of the in-device propagation times (shown as "$\Delta_{Tx}$" and "$\Delta_{Rx}$") are unknown (e.g., errors) and can correspond to group delays and timing errors. A one nanosecond (1 ns) error in either "$\Delta_{Tx}$" or "$\Delta_{Rx}$" can lead to about a one foot (1 ft) positioning inaccuracy.

Generally, to reduce positioning inaccuracies, the UE 310 needs to precisely determine the transmission timing for SRS. Otherwise, each one nanosecond error can result in a one foot positioning inaccuracy. The UE 310 can track the timing based on its own clock running at a certain frequency and based on timing information received on the downlink. The UE 310 can also adjust the timing based on timing advance (TA) command.

Furthermore, in release 15 of the 3GPP specifications, the UE 310 is not needed to transmit SRS during DRX inactive time (e.g., while the UE is in a power saving state). In newer releases of the 3GPP specifications, the UE 310 may transmit PRS during DRX inactive time to reduce or avoid degradation of the positioning accuracy. As explained herein above, the positioning accuracy, especially of timing-based positioning methods, depends on how well the UE 310 can track the timing transmission of SRS. But to transmit SRS, the UE 310 needs to maintain some of its components active during the DRX inactive time, where these components are on the transmit side (e.g., an RF transmitter) and would have been otherwise deactivated (e.g., powered off). And to precisely track the timing, the UE 310 would need to maintain its clock at a high frequency (e.g., in the GHz range for its ticks) and additional components that are on the receive side active (e.g., an RF receiver) to track receive timing information, track downlink drift and/or receive TA commands. Hence, less power saving is achieved overall during the DRX inactive time.

Accordingly, a balance between precisely tracking the timing and the power consumption would improve the synergy between the DRX method and the UE positioning. In particular, when a positioning method need not have a high-timing accuracy, such as in the case of angular-based positioning method (e.g., UL-AoA), less precision in tracking the timing can be afforded to improve the power consumption. Conversely, when a positioning method relies on a high-timing accuracy, such as in the case of timing-based positioning method (e.g., UL-TDOA, multi-RTT), power consumption can be justifiably used to allow for high-timing precision tracking. In other words, an optimized balance between timing precision tracking and power consumption can be achieved by accounting for the type of SRS measurements that are to be performed.

Referring back to release 15 of the 3GPP specifications, TS 38.133, which is incorporated herein by its entirety, specifies a timing error limit "$T_e$" for UE transmission in section 7.1, including table 7.1.2-1. This table in TS 38.133 is reproduced here as Table 1 below.

TABLE 1

Timing Error Limit, $T_e$

| Frequency Range | SCS of SSB signals (kHz) | SCS of uplink signals (kHz) | $T_e$ |
| --- | --- | --- | --- |
| 1 | 15 | 15 | $12*64*T_c$ |
|   |    | 30 | $10*64*T_c$ |
|   |    | 60 | $10*64*T_c$ |
|   | 30 | 15 | $8*64*T_c$ |
|   |    | 30 | $8*64*T_c$ |
|   |    | 60 | $7*64*T_c$ |
| 2 | 120 | 60 | $3.5*64*T_c$ |
|   |     | 120 | $3.5*64*T_c$ |
|   | 240 | 60 | $3*64*T_c$ |
|   |     | 120 | $3*64*T_c$ |

Note
1: $T_c$ is the basic timing unit defined in TS 38.211 [6]

This timing error limit is applicable to the first transmission in a DRX cycle. But the release 15 of the 3 GPP specifications does not define timing error limits for other transmission during DRX inactive time.

Hence, and in an example, the optimized balance between timing precision tracking and power consumption during DRX inactive time can be achieved by defining timing error limits for the UE transmission of SRS, where the timing error limits can depend on targeted timing accuracies. For instance, if a positioning method need not involve a high-timing accuracy and can instead, involve a low-timing accuracy, a first set of timing error limits may be used. If a different positioning method involves a high-timing accuracy, a second set of timing error limits may be used, where this second set defines more stringent timing requirements (e.g., lower timing errors) than the first set.

To illustrate, an angular-based positioning method need not use a high-timing accuracy. In this case, a first set of timing error limits can be defined, similar to the ones in Table 1. A timing-based positioning method may involve a high-timing accuracy. In this case, a second set of timing error limits can be defined, where these timing errors are smaller than the ones specified in Table 1.

Of course, the above illustration is merely an example and the embodiments of the present disclosure are not limited as such. Instead, more than two timing accuracies may be supported (e.g., to achieve more granularity than high-timing accuracy and low-timing accuracy).

In addition, multiple timing accuracies that may be supported for a same positioning method. In this case, which of the timing accuracies to support can depend on a number of factors related to, for instance, default configuration, SRS configuration, and power consumption. For instance, for a timing-based positioning method, a high-timing accuracy and a low-timing accuracy may be supported. When the UE's power storage (e.g., battery level) is below a power threshold, the UE can support the low-timing accuracy. Otherwise, the UE can support the high-timing accuracy.

During DRX inactive time, the UE supports a timing accuracy by maintaining just enough components to track the timing at a precision necessitated by the timing accuracy. For instance, for a first-timing accuracy (e.g., a high-timing accuracy) that is larger than a second-timing accuracy (e.g., a low-timing accuracy), the UE may run its clock at a relatively higher frequency (e.g., a GHz frequency for the first-timing accuracy, in comparison to a MHz frequency for the second-timing accuracy) and may maintain its downlink RF receiver active to track downlink drift or receive TA commands (whereas this RF received may be deactivated for the second-timing accuracy).

Correspondingly, upon receiving SRS transmitted from the UE during the DRX inactive time, the base station can determine the applicable timing accuracy for the positioning method to be used. Based on the determined timing accuracy and other factors (e.g., uplink frequency), the base station can determine the applicable timing error limit and can perform measurements on the SRS given the determined timing error limit.

In various embodiments of the present disclosure, the UE can signal, to the base station, its capability to support one or more timing accuracies and/or an actually supported timing accuracies. Additionally or alternatively, the base station can configure the UE to support one or more timing accuracies. Furthermore, a default timing accuracy may be supported, unless otherwise signaled by the UE and/or base station.

Figure 4:
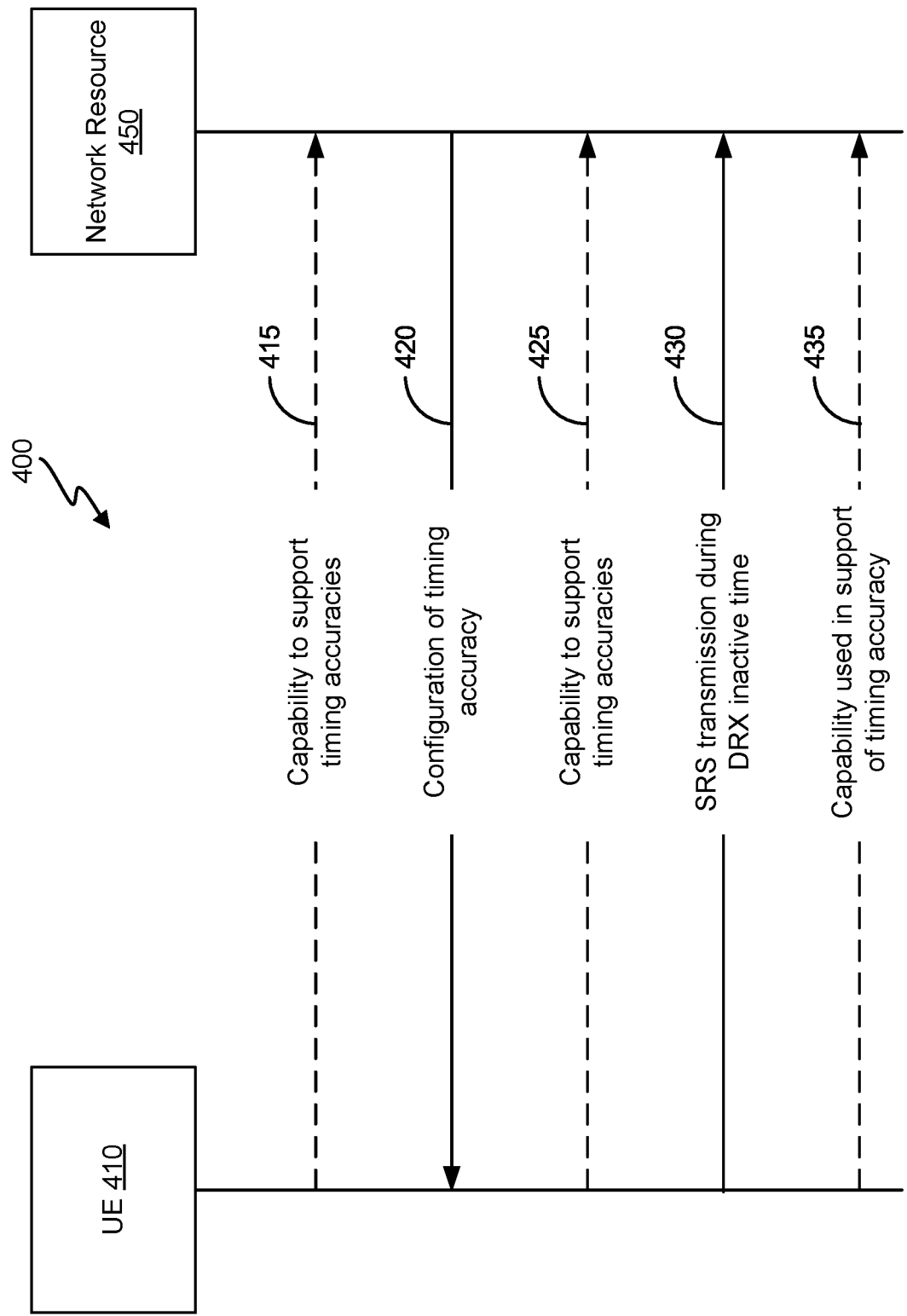
FIG. 4 illustrates an example of a sequence diagram for configuring timing accuracy associated with transmitting a reference signal, in accordance with at least one embodiment.

FIG. 4 illustrates an example of a sequence diagram 400 for configuring timing accuracy associated with transmitting a reference signal, in accordance with at least one embodiment. The reference signal is transmitted from a UE 410 to a network resource 450. The UE 410 is an example of the UE 105 and the UE 310. In one example, the network resource 450 includes a location server (such as the LMF 120) and/or a base station (such as gNB 110, ng-eNB 114, WLAN 116, and/or the base station 350). In this example, the location server and the base station may be integrated as a single component of the network resource 450. Further, the reference signal can be transmitted in a positioning session, such as an LPP session, that is established and is ongoing between the UE 410 and the network resource 450. In another example, the network resource 450 may be a second UE, where a sidelink may exist between the UE 410 and the second UE. In this example, the reference signal may be transmitted in support of sidelink positioning.

The network resource 450 may configure the UE 410 to use one or more timing accuracies. The configuration 450 may, but need not, depend on capability information reported by the UE 450 about the UE's 450 support of timing accuracies. In the sequence diagram 400, dashed arrow indicate optional steps that may not be performed.

As illustrated, in a first, optional step of the sequence diagram 400, indicated by arrow 415, the UE 410 may signal its capability to support timing accuracies. For instance, the capability is signaled by sending capabilities information in a message according to a protocol of the positioning session (e.g., an LPP protocol, where this message may be an LPP provide capabilities information message). The message may indicate one or more timing accuracies that the UE can support. For instance, if the UE 410 supports a high-timing accuracy and a low-timing accuracy, the message may include a first field set to "high-timing accuracy" or "high" and a second field set to "low-timing accuracy" or "low" or some other ways to identifies these two supported accuracies to the network resource 450. In addition, the support of the one of the timing frequencies (e.g., the low-timing accuracy) may be assumed as a default. In this case, the message may merely identify any other, non-default timing accuracies that the UE 410 supports (e.g., the high-timing accuracy).

In a second step of the sequence diagram 400, indicated by arrow 420, the network resource 450 may configure the UE 410 to enable the use of one of the timing accuracies. For instance, the network resource 450 sends to the UE 410 configuration information indicating a particular timing accuracy to use. Additionally or alternatively, the configuration information may indicate a positioning method to be used by the network resource 450 and the UE 410 may determine a particular timing accuracy that should be supported given the positioning method (e.g., the UE may store a mapping of a table indicating that for an angular-based positioning method, low-timing accuracy is to be supported; whereas for a timing-based positioning method, high-timing accuracy is to be supported). The configuration information can be specific to an SRS resource set, an SRS resource, a BWP, a component carrier (CC), and/or a band.

In an example, the configuration information may be generated by the base station 450 in response to the signaled UE capability. In this way, the base station 450 may select one or more of only the supported timing accuracies. In yet another example, if the configuration information does not indicate a specific timing accuracy or may give the option for the UE 410 to select one from possible timing accuracies. In this example, the UE 410 may perform the selection. One possible selection may use a default rule (e.g., default to supporting a low-timing accuracy). Another possible selection may apply a rule that considers a number of factors related to, for instance, SRS allocation, channel quality information (CQI) on a downlink channel carrying timing information, and/or power consumption. For instance, when the UE's 410 power storage (e.g., battery level) is below a power threshold, the UE 410 may select to support the low-timing accuracy. Otherwise, the UE 410 can may select to support a high-timing accuracy.

In a third, optional step of the sequence diagram 400, indicated by arrow 420, the UE 410 may signal its capability to support timing accuracies. this step may be similar to the first step, except that it may be carried just before the UE 410 enters a power saving state (e.g., just before the DRX inactive time starts). In an example, here, the capabilities information may be transmitted if, for instance, the timing accuracy indicated by the configuration information is not supported or is no longer supported (e.g., because of the UE's 410 power storage dropping below the power threshold) or a selection was left to the UE 410.

Subsequently, the UE 410 enters the power saving state (e.g., the DRX inactive time starts). While in the power saving state, the UE 410 transmits SRS to the network resource 450 as indicated with a fourth step of the sequence diagram 400, at arrow 430. In an example, the timing of the transmission depends on the timing accuracy that was configured by the network resource 450 (and/or possible selected or changed by the UE 410 as described in connection with the second and third steps of the sequence diagram 400). In particular, the UE 410 maintains, during the DRX inactive time, the necessary components active (e.g., its clock running at a particular frequency and its RF receiver receiving downlink timing information and TA commands, as applicable) to track, at the precision necessitated by the timing accuracy, the timing (e.g., the slot number and OFDM symbol number) to wake up (e.g., power on the RF transmitter and other uplink components) and transmit the SRS.

In a fifth, optional step, indicated by arrow 435, the UE 410 signals to the network resource 450 the capability that it actually used in support of the timing accuracy. This signaling can occur as soon as the UE 410 transitions out of the power saving mode (e.g., the DRX inactive time stops and the DRX active time starts). The signaling can take the form of a MAC control element (MAC-CE), RRC signaling, or LPP signaling and can indicate a particular timing accuracy according to which the timing of the SRS transmission was tracked. In an example, the signaling is performed if, for instance, the timing accuracy indicated by the configuration information is not supported or was no longer supported (e.g., because of the UE's 410 power storage dropping below the power threshold during the DRX inactive time) or a selection was left to the UE 410.

Figure 5:
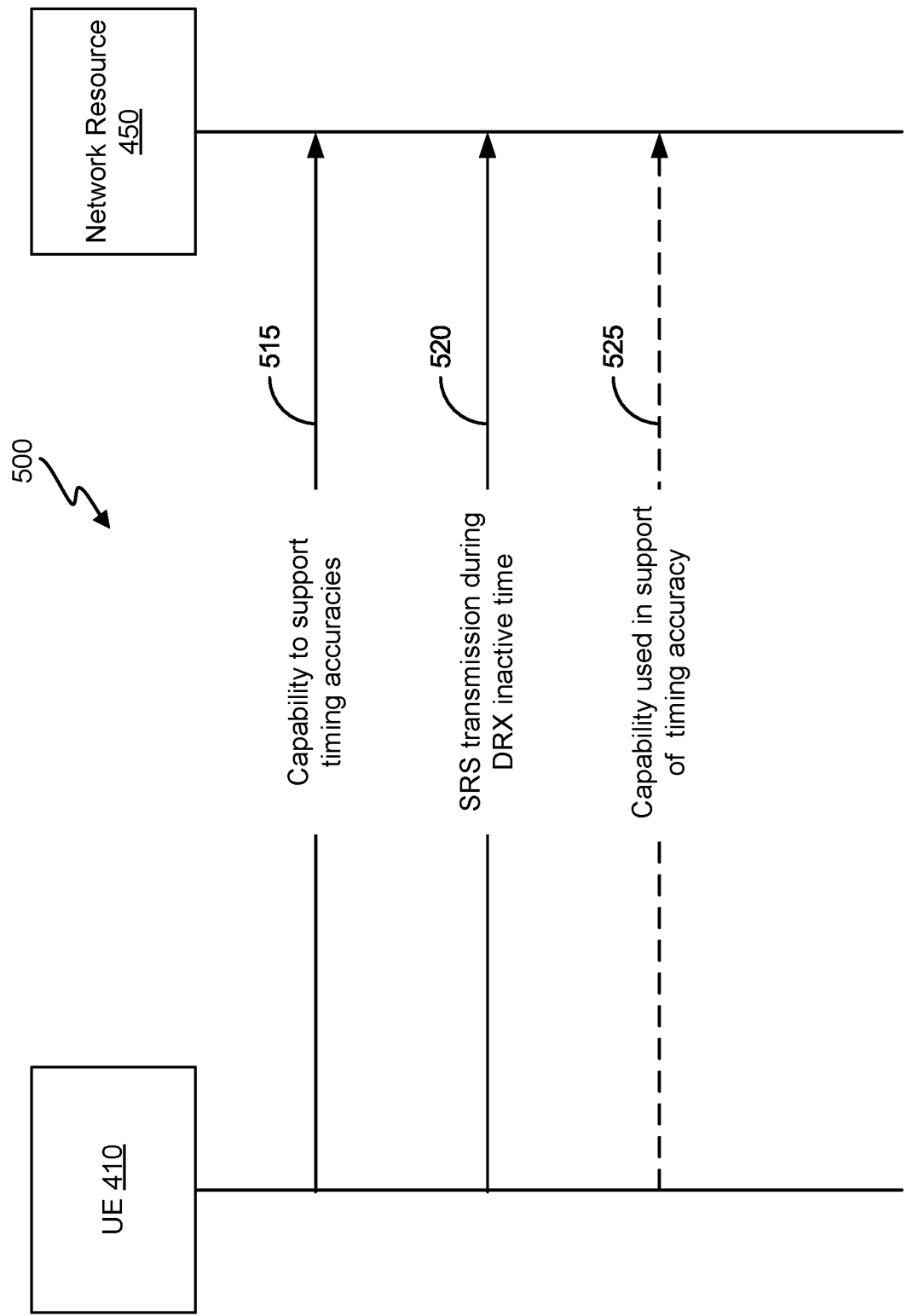
FIG. 5 illustrates an example of a sequence diagram for signaling timing accuracy capability associated with transmitting a reference signal, in accordance with at least one embodiment.

FIG. 5 illustrates an example of a sequence diagram 500 for signaling timing accuracy capability associated with transmitting a reference signal, in accordance with at least one embodiment. Unlike the sequence diagram 400 of FIG. 4, the capability of the UE 410 may be signaled to the network resource 450 independently or absent of the configuration information of the network resource 450. In other words, the UE 410 may signal its capability to the network resource 450 and proceed to transmit SRS during the DRX inactive state based on the reported capability.

As illustrated, in a first step of the sequence diagram 500, indicated by arrow 515, the UE 410 signals its capability to support one or more of the timing accuracies. Generally, the signaling is performed during the positioning session and prior to the UE 410 entering the power saving state. In an example, the signaling can indicate a particular timing accuracy that the UE 410 is to support during the DRX inactive time. In another example, the signaling indicates all the timing accuracies that the UE 410 can support and the particular one that the UE 410 is to support during the DRX inactive time. In both these examples, the UE 410 can select the particular timing accuracy based on a default rule or on a selection rule. The selection rule can involve several factors. Certain selection factors relate to, for instance, SRS allocation, CQI on a downlink channel carrying timing information, and/or power consumption. Additionally or alternatively, certain selection factors relate to the positioning method to be used, the type of positioning measurements to be determined from the reference signal (e.g., timing measurements or angular measurements). In yet another example, the signaling indicates all the timing that the UE 410 can support without indicating the particular one. In this example, the UE 410 and the network resource 450 may store similar selection rules to select the particular timing accuracy. One possible selection rule may use various factors related to, for instance, SRS allocation, CQI on a downlink channel carrying timing information, and the like. In this way, without indicating the particular timing accuracy that the UE 410 is to support during the DRX inactive time, both the UE 410 and the network resource 450 can resolve to the same determination of the particular timing accuracy.

Subsequently, the UE 410 enters the power saving state (e.g., the DRX inactive time starts). While in the power saving state, the UE 410 transmits SRS to the network resource 450 as indicated with a second step of the sequence diagram 500, indicated by arrow 520. In an example, the timing of the transmission depends on the timing accuracy of the particular timing accuracy. More specifically, the UE 410 maintains, during the DRX inactive time, the necessary components active (e.g., its clock running at a particular frequency and its RF receiver receiving downlink timing information and TA commands, as applicable) to track, at the precision necessitated by the timing accuracy, the timing to wake up and transmit the SRS.

In a third, optional step, indicated by arrow 525, the UE 410 signals to the network resource 450 the capability that it actually used in support of the timing accuracy. This signaling can occur as soon as the UE 410 transitions out of the power saving mode (e.g., the DRX inactive time stops and the DRX active time starts). The signaling can take the form of a MAC-CE, RRC signaling, or LPP signaling and can indicate a particular timing accuracy according to which the timing of the SRS transmission was tracked. In an example, the signaling is performed if, for instance, the timing accuracy indicated by the capabilities information was no longer supported (e.g., because of the UE's 410 power storage dropping below the power threshold during the DRX inactive time) or in the case when the UE 410 signaled the different timing accuracies that it can support without indicating the particular timing accuracy.

Figure 6:
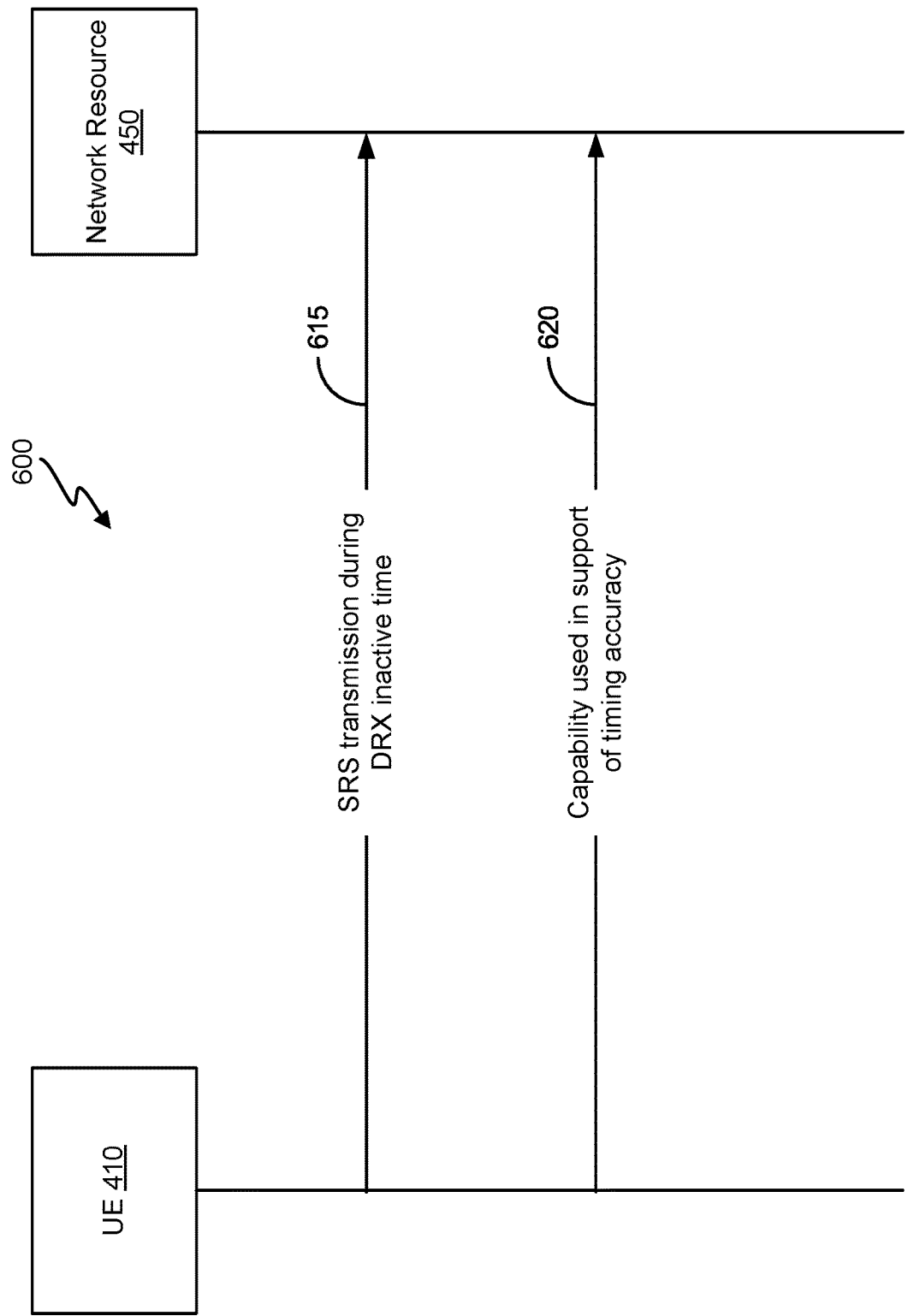
FIG. 6 illustrates an example of a sequence diagram for signaling a used timing accuracy capability associated with transmitting a reference signal, in accordance with at least one embodiment.

FIG. 6 illustrates an example of a sequence diagram 600 for signaling a used-timing accuracy capability associated with transmitting a reference signal, in accordance with at least one embodiment. Unlike the sequence diagrams 400 and 500 of FIGS. 4 and 5, no pre-coordination may occur between the UE 410 and the network resource 450 during the positioning session and prior to the SRS transmission. Instead, once the SRS is transmitted, the UE 410 can indicate the actual supported timing accuracy to the network resource 450.

As illustrated, the UE 410 enters the power saving state (e.g., the DRX inactive time starts). While in the power saving state, the UE 410 transmits SRS to the network resource 450 as indicated with a first step of the sequence diagram 500 at arrow 615. In an example, the timing of the transmission depends on the timing accuracy of a particular timing accuracy that the UE 410 may select to support during the DRX inactive time. More specifically, the UE 410 maintains, during the DRX inactive time, the necessary components active (e.g., its clock running at a particular frequency and its RF receiver receiving downlink timing information and TA commands, as applicable) to track, at the precision necessitated by the timing accuracy, the timing to wake up and transmit the SRS. Here, the UE 410 can select the particular timing accuracy based on a default rule or on a selection rule that involve factors related to, for instance, SRS allocation, CQI on a downlink channel carrying timing information, and/or power consumption.

In a second step, indicated by arrow 620, the UE 410 signals to the network resource 450 the capability that it actually used in support of the timing accuracy. This signaling can occur as soon as the UE 410 transitions out of the power saving mode (e.g., the DRX inactive time stops and the DRX active time starts). The signaling can take the form of a MAC-CE, RRC signaling, or LPP signaling and can indicate a particular timing accuracy according to which the timing of the SRS transmission was tracked.

FIGS. 7-10 show illustrative flows related to the use of timing accuracies in support of UE positioning in a position session between a UE and a network resource, where one or more cycles of power saving states may occur, in accordance with various embodiments. Some or all of instructions for performing the operations of the illustrative flows can be implemented as hardware circuitry and/or stored as computer-readable instructions on a non-transitory computer-readable medium of the UE (e.g., the 410) and/or on a non-transitory computer-readable medium of the network resource (e.g., the network resource 450). As implemented, the instructions represent modules that include circuitry or code executable by a processor(s) of the UE or the network resource, as applicable. The use of such instructions configures the UE or the network resource, as applicable, to perform the specific operations described herein. Each circuitry or code in combination with the processor represents a means for performing a respective operation(s). For instance, means for performing the functionality at each operation of the target shown in FIGS. 7-10 may comprise software and/or hardware components of the UE, such as the bus 1105, processing unit(s) 1110, DSP 1120, wireless communication interface 1130, memory 1160, and/or other components of the UE 1100 illustrated in FIG. 11 and/or comprise software and/or hardware components of a network resource, such as the bus 1205, processing unit(s) 1210, DSP 1220, wireless communication interface 1230, memory 1260, and/or other components of the network resource 1200 illustrated in FIG. 12. While the operations are illustrated in a particular order, it should be understood that no particular order is necessary and that one or more operations may be omitted (e.g., as illustrated with dashed boxes), skipped, performed in parallel, and/or reordered.

Furthermore, the flows of FIGS. 7-10 are described herein in connection with transmitting SRS during DRX inactive time. However, the operations of the flow similarly apply to other types of reference signals and to other types of power saving procedures (e.g., to RRC-idle or RRC-inactive). In FIGS. 7-10, a positioning session (e.g., an LPP session) is ongoing and one more DRX cycles may occur, whereby the UE may transmit SRS during at least one of the DRX inactive times.

Figure 7:
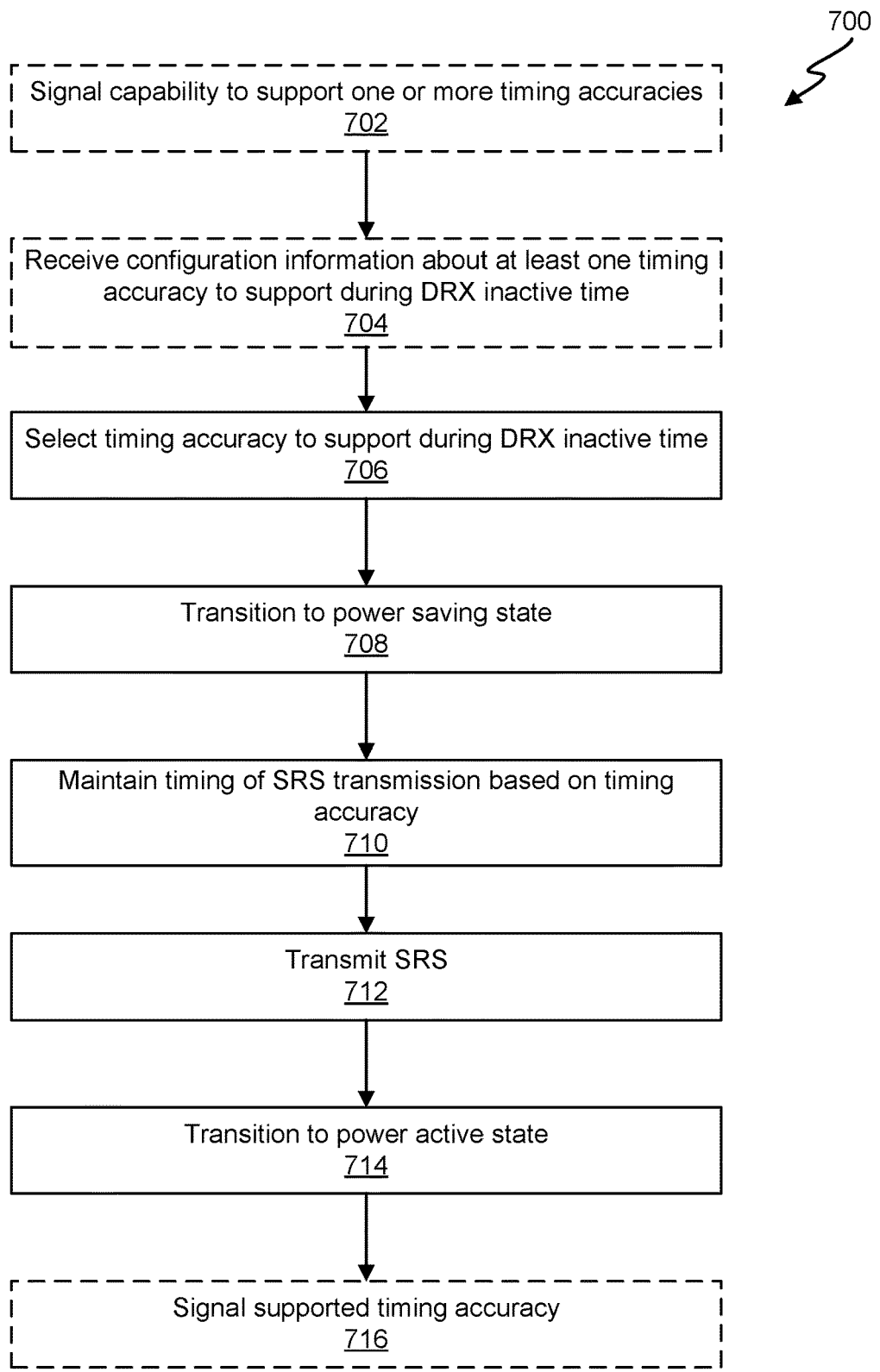
FIG. 7 illustrates an example of a flow for transmitting a reference signal for UE positioning, in accordance with at least one embodiment.

FIG. 7 illustrates an example of a flow 700 for transmitting a reference signal (e.g., SRS) for UE positioning, in accordance with at least one embodiment. The flow includes operation 702, where the UE signals its capability to support or more timing accuracies. For example, the UE sends capabilities information in an LLP message to the network resource prior to the start of the DRX inactive time. As described in connection with the sequence diagrams 400 and 500 of FIGS. 4 and 5, the capabilities information may indicate the different timing accuracies that the UE can support and/or the particular capability information that the UE is to support during DRX inactive time.

The flow 700 also includes operation 704, where the UE receives configuration information about at least one timing accuracy to support during DRX inactive time. In an example, the network resource generates and signals, prior to the DRX inactive time, the configuration information to the UE per SRS resource set, SRS resource, BWP, CC, and/or band. As described in connection with the sequence diagram 400 of FIG. 4, the configuration can be generated based on or independently of the signaled UE capability and can indicate one or more timing accuracies that the UE is to support or an option for the UE to select and support one of such timing accuracies.

The flow 700 also includes operation 706, where the UE selects a timing accuracy to support during DRX inactive time. Different types of selection are possible. In one example, the selection is performed according to the configuration information. For instance, if the configuration information indicates a particular timing accuracy to support or a particular positioning method associated with the particular timing accuracy (e.g., in a table or some other type of mapping), the UE selects this particular timing accuracy. If no such indication is available, the UE can apply a default rule to select a default timing accuracy or a selection rule to select the particular timing accuracy based on a number of selection factors. Some of the selection factors can relate to, for instance, for instance, SRS allocation, CQI on a downlink channel carrying timing information, and/or power consumption. Other selection factors can relate to relate to the positioning method to be used, the type of positioning measurements to be determined from the reference signal (e.g., timing measurements or angular measurements).

The flow 700 also includes operation 708, where the UE transitions to a power saving state. For example, the DRX inactive time starts and the UE deactivates (e.g., powers off) transmit and receive components. Nonetheless, particular components may remain active, where these components depend on the precision needed to track the timing of the SRS transmission and meet the timing accuracy. For instance, for high-timing accuracy, the UE's clock may run at a high frequency (e.g., in a GHz range) and its RF receiver that receives downlink timing information and TA commands may remain powered on. For low-timing accuracy, the UE's clock may run at a low frequency (e.g., in a MHz range) and its RF receiver may be powered off.

The flow 700 also includes operation 710, where the UE maintain the time of the SRs transmission based on the timing accuracy. For instance, for the high-timing accuracy, the UE may update its absolute time given the ticks of its clock, track downlink drift given received downlink timing information, and/or adjust the tracked time given a TA command. In comparison, for the low-timing accuracy, the UE may merely update its absolute time. In this way, the UE can determine when (e.g., the slot number and the OFDM symbol number) to wake up and transmit SRS at the timing precision that meets the timing accuracy that is to be supported.

The flow 700 also includes operation 712, where the UE transmits SRS. For example, during the DRX inactive time and when the UE needs to wake up given the tracked timing, the UE powers on an RF transmitter and transmits the SRS to the network resource.

The flow 700 also includes operation 714, where the UE transition to power active state (e.g., DRX active time). For example, the UE activates (e.g., powers on) the various RF transmit and receive components for uplink and downlink communications with the network resource.

The flow 700 also includes operation 716, where the UE signals to the UE the timing accuracy that was supported during the DRX inactive time. For example, the signaling uses MAC-CE, RRC signaling, or LPP signaling, whereby the UE indicates the timing accuracy that it actually supported during the DRX inactive time, as described in connection with the sequence diagrams 400, 500, and 600 of FIGS. 4, 5 and 6.

Figure 8:
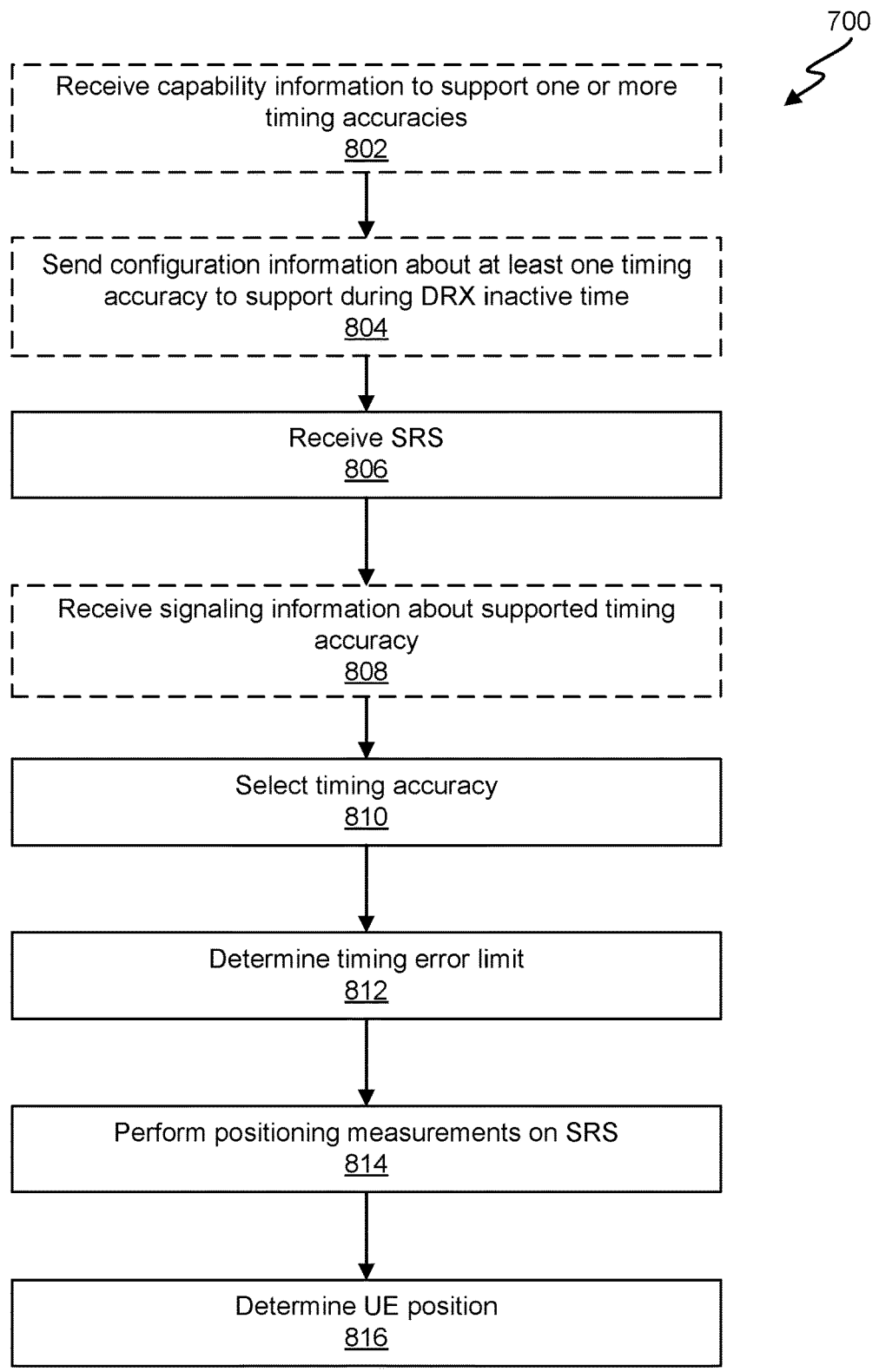
FIG. 8 illustrates an example of a flow for UE positioning by performing measurements on a reference signal, in accordance with at least one embodiment.

FIG. 8 illustrates an example of a flow 800 for UE positioning by performing measurements on a reference signal (e.g., SRS), in accordance with at least one embodiment. Here, the network resource receives SRS transmitted by the UE while being in the power saving state and supporting a timing accuracy and the network resource performs measurements on the SRS according to the timing accuracy.

The flow 800 includes operation 802, where the network resource receives capability information from the UE, where the capability information indicates one or more timing accuracies that the UE can support. For example, and as described herein above in connection with the sequence diagrams 400 and 500 of FIGS. 4 and 5, the network resource receives the capability information during the positioning session and prior to DRX inactive time.

The flow 800 also includes operation 804, where the network resource sends configuration information about at least one timing accuracy to support during DRX inactive time. For example, and as described in connection with the sequence diagram 400 of FIG. 4, the network resource signals the configuration information based on or independently of the capability information and the configuration information can be specific to an SRS resource set, an SRS resource, BWP, CC, or band. In an example, the network resource selects a timing accuracy that the UE is to support based on a positioning method that the network resource is to use and/or the type of positioning measurements that the network resource will perform on SRS transmitted by the UE, and indicates this selection in the configuration information. For instance, for a timing-based positioning method, the network resource may select a high-timing accuracy. For an angular-based positioning method, the network resource may select a low-timing accuracy.

The flow 800 also includes operation 806, where the network resource receives SRS. For example, the SRS is transmitted by the UE while the UE is in the power saving mode, and the transmission's timing can depend on a particular timing accuracy that the UE supported during the DRX inactive time.

The flow 800 also includes operation 808, where the network resource receives signaling information about the particular timing accuracy that the UE supported during the DRX inactive time. For example, and as described in connection with the sequence diagrams 400, 500, and 600 of FIGS. 4, 5 and 6, the UE signals the timing accuracy that it actually supported for the transmission of the SRS during the DRX inactive time.

The flow 800 also includes operation 810, where the network resource selects a timing accuracy. The selection can depend on a number of factors. in one example, the selection may be limited to one of the timing accuracies indicated in the UE's capabilities information. In another example, the selection may be limited to the particular timing accuracies indicated in the signaling information. In yet another example, the selection may be limited to the particular timing accuracy indicated in the configuration information. Nonetheless, if none of such information is signaled or used, the selection can depend on a number of factors. For instance, the selection can depend on the positioning method that the network resource is to use.

The flow 800 also includes operation 812, where the network resource determines a timing error limit based on the particular timing accuracy that the UE supported during the DRX inactive time to transmit the SRS. For instance, the network resource may store in local memory a set of timing errors per timing accuracy (e.g., a first set for a low-timing accuracy and a second set for a high-timing accuracy) and/or per positioning method (e.g., a first set for an angular-based positioning method and a second set for a timing-based positioning method). Given the timing accuracy that the UE supported and/or positioning method that the network resource is to use, the network resource can determine the applicable set of the timing errors. Based on a number of factors, such as uplink frequency, the network resource can further determine the particular timing error limit to use from the applicable set.

The flow 800 also includes operation 814, where the network resource performs positioning measurements on the SRS. For example, the network resource applies the positioning method to the SRS to derive the positioning measurements given the timing error limit (e.g., UL-RTOA measurements, UL SRS-RSRP measurements, Rx-Tx time difference measurements, etc.)

The flow 800 also includes operation 816, where the network resource determines the UE position based on the measurements. For instance, the UE position is derived from the UL-RTOA measurements, UL SRS-RSRP measurements, and/or Rx-Tx time difference measurements.

Figure 9:
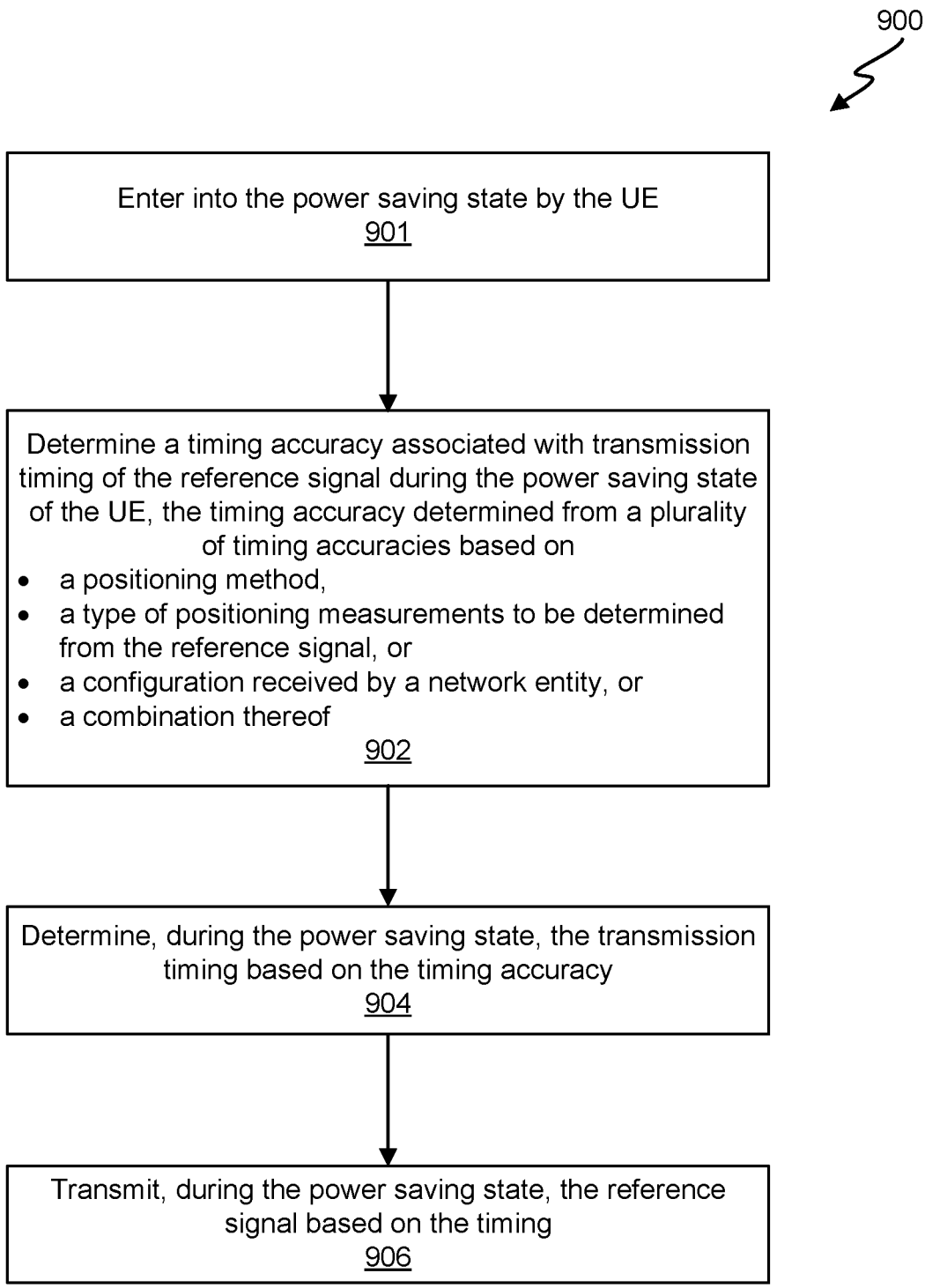
FIG. 9 illustrates an example of a flow for using timing accuracy associated with transmitting a reference signal used in a positioning session, in accordance with at least one embodiment.

FIG. 9 illustrates an example of a flow 900 for using timing accuracy associated with transmitting a reference signal used in a positioning session, in accordance with at least one embodiment. The flow 900 corresponds to a method implemented by a UE (e.g., UE 410) for transmitting a reference signal for positioning.

According to some embodiments, the method may be performed by the UE while in a power saving state corresponding to a DRX, RRC-idle, or RRC-inactive state. As such, the flow 900 includes operation 901, comprising entering into the power saving state by the UE.

The flow 900 includes operation 902, where the UE determines a timing accuracy associated with transmission timing of the reference signal during a power saving state of the UE. The timing accuracy is determined from a plurality of timing accuracies (e.g., a high timing accuracy and a low timing accuracy) based on a positioning method, a type of positioning measurements to be determined from the reference signal, or a configuration received by a network resource, or a combination thereof. In an example, the plurality of timing accuracies includes (i) a first timing accuracy associated with an angular-based positioning method (e.g., a low timing accuracy) and (ii) a second timing accuracy associated with a timing-based positioning method (a high timing accuracy). The second timing accuracy requires a lower timing error limit than the first timing accuracy. In this example, the plurality of timing accuracies further includes (iii) a third timing accuracy associated with the timing-based positioning method (the same or a different low timing accuracy). The third timing accuracy allows a larger timing error limit than the second timing accuracy and is the same as or different than the first timing accuracy. Further, the UE can apply a default rule to select a default timing accuracy or a selection rule to select the particular timing accuracy based on a number of selection factors, as previously described. Thus, a timing accuracy may be implicitly tied to a configuration or usage of the reference signal (e.g., an SRS configuration or SRS usage).

Means for performing the functionality at operation 902 may comprise software and/or hardware components of the UE, such as the bus 1105, processing unit(s) 1110, DSP 1120, wireless communication interface 1130, memory 1160, and/or other components of the UE 1100 illustrated in FIG. 11 and described in more detail below.

The flow 900 also includes operation 904, where the UE determines, during the power saving state, the transmission timing based on the timing accuracy. In an example, the plurality of timing accuracies includes a first timing accuracy (e.g., a low timing accuracy) and a second timing accuracy (e.g., a high timing accuracy). In this example, the second timing accuracy may require higher accuracy (e.g., lower timing error limit) than the first timing accuracy. According to some embodiments UE may be configured to maintain, relative to the first timing accuracy, an additional component (e.g., an RF receiver) active during the power saving state in support of the second timing accuracy. Additionally or alternatively, the UE may be configured to maintain, relative to the first timing accuracy, a clock of the UE at a higher speed (e.g., GHz frequency) in support of the second timing accuracy.

Means for performing the functionality at operation 904 may comprise software and/or hardware components of the UE, such as the bus 1105, processing unit(s) 1110, DSP 1120, wireless communication interface 1130, memory 1160, and/or other components of the UE 1100 illustrated in FIG. 11 and described in more detail below.

The flow 900 also includes operation 906, where the UE transmits, during the power saving state, the reference signal based on the timing. In an example, the reference signal is an uplink SRS for positioning. In such embodiments, the power saving state corresponds to a DRX-inactive state, an RRC-idle state, or and RRC-inactive state. More generally, a power saving state may correspond with a state or mode of operation of the UE in which power consumption of the UE is lower than at least one other state or mode of operation, which can impact the accuracy of transmission timing of a reference signal.

Means for performing the functionality at operation 906 may comprise software and/or hardware components of the UE, such as the bus 1105, processing unit(s) 1110, DSP 1120, wireless communication interface 1130, memory 1160, and/or other components of the UE 1100 illustrated in FIG. 11 and described in more detail below.

In an example, method illustrated in part in flow 900 can also include the UE transmitting, to the location server, capabilities information indicating that the UE supports transmission of a reference signal for positioning transmissions with at least the timing accuracy. In some embodiments, the capabilities information is transmitted prior to the UE being in the power saving state. Additionally or alternatively, as previously noted, capabilities may be implied based on the configuration and/or usage of the reference signal.

In the above example, the method illustrated in part in flow 900 can also include the UE receiving, from the network resource and prior to the UE being in the power saving state, configuration information indicating a use of at least the timing accuracy. The configuration information may indicate the use per bandwidth part BWP. Additionally or alternatively, the configuration information may indicate the use at least per component carrier or band. Additionally or alternatively, the reference signal is SRS for positioning purposes. The configuration information may indicate the use at least per SRS resource or SRS resource set.

In an example, the method illustrated in part in flow 900 can also include the UE transmitting, to the network resource, capabilities information indicating that the UE supports transmission of a reference signal for positioning transmission with the plurality of timing accuracies, and receiving, from the network resource, configuration information indicating a use of at least the timing accuracy from the plurality of timing accuracies. The timing accuracy may be further determined based on the configuration information.

In an example, the method illustrated in part in flow 900 can also include the UE signaling, to the network resource, the timing accuracy used in the determining of the transmission timing. In some embodiments, the timing accuracy may be signaled after the transmitting of the reference signal. Further, in some embodiments, the timing accuracy may be signaled while the UE is no longer in the power saving state.

Means for performing the functionality at the above additional operations of the method may comprise software and/or hardware components of the UE, such as the bus 1105, processing unit(s) 1110, DSP 1120, wireless communication interface 1130, memory 1160, and/or other components of the UE 1100 illustrated in FIG. 11 and described in more detail below.

Figure 10:
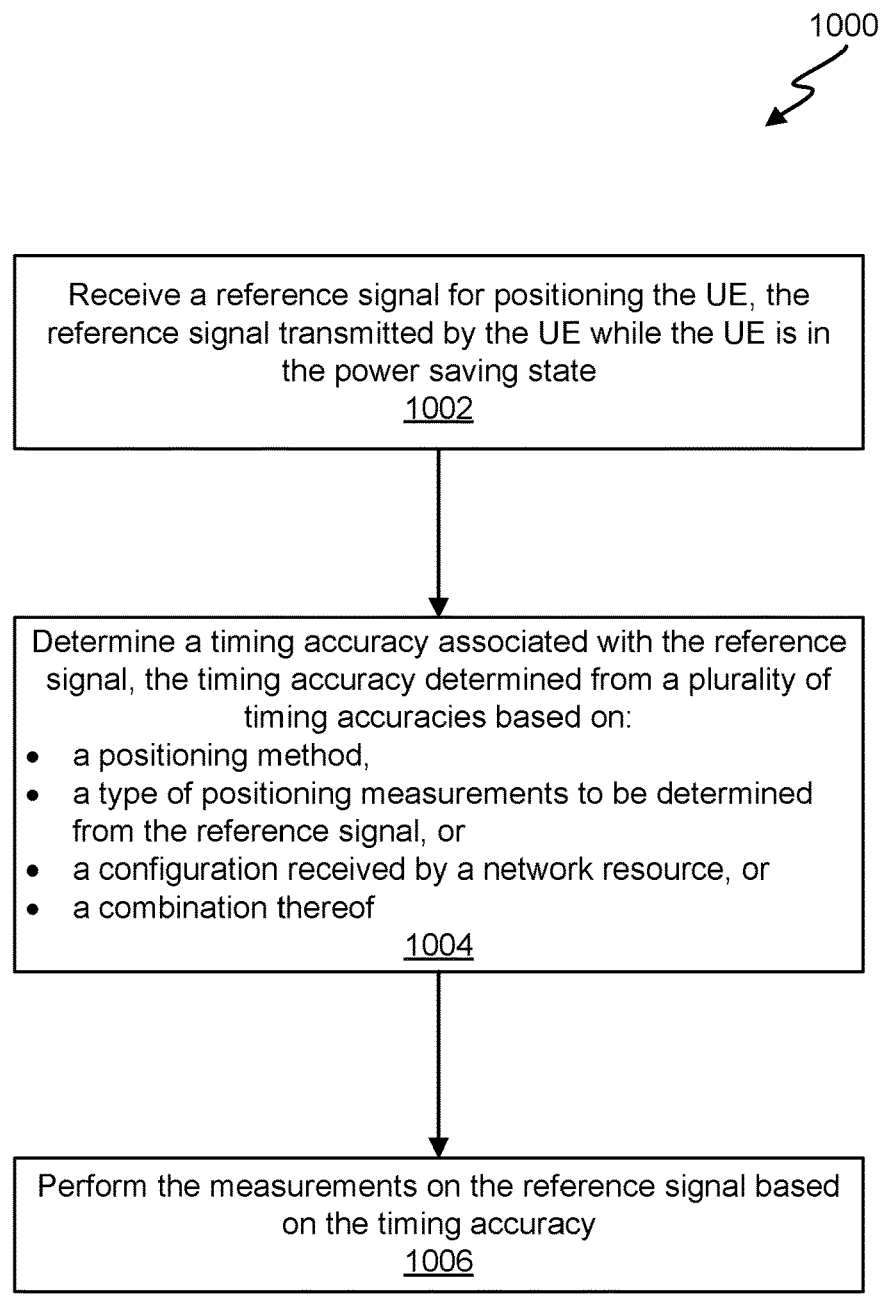
FIG. 10 illustrates another example of a flow for using timing accuracy associated with transmitting a reference signal used in a positioning session, in accordance with at least one embodiment.

FIG. 10 illustrates another example of a flow 1000 for using timing accuracy associated with transmitting a reference signal used in a positioning session, in accordance with at least one embodiment. The flow 1000 corresponds to a method implemented by a network resource (e.g., network resource 450) in support of positioning a UE (e.g., the UE 410). Again, according to some embodiments, the method may be performed by the UE while in a power saving state corresponding to a DRX, RRC-idle, or RRC-inactive state.

The flow 1000 includes operation 1002, where the network entity receives a reference signal for positioning the UE, the reference signal transmitted by the UE while the UE is in a power saving state. In an example, the reference signal may comprise an uplink SRS for positioning. Additionally or alternatively, the power saving state may correspond to a DRX-inactive state, an RRC-idle state, or an RRC-inactive state.

Means for performing the functionality at operation 1002 of the method may comprise software and/or hardware components of the network entity, such as the bus 1205, processing unit(s) 1210, DSP 1120, wireless communication interface 1230, memory 1260, and/or other components of the network resource 1200 illustrated in FIG. 12 and described in more detail below.

The flow 1000 also includes operation 1004, where the network resource determines a timing accuracy associated with the reference signal, the timing accuracy determined from a plurality of timing accuracies based on a positioning method, a type of positioning measurements to be determined from the reference signal, or a configuration received by a network resource, or a combination thereof. In an example, the plurality of timing accuracies includes (i) a first timing accuracy associated with an angular-based positioning method (e.g., a low timing accuracy) and (ii) a second timing accuracy associated with a timing-based positioning method (e.g., a high timing accuracy). The second timing accuracy may require a lower timing error limit than the first timing accuracy. In this example, the timing accuracy may be determined to be the first timing accuracy if the angular-based positioning method is used in the positioning measurements on the reference signal. In some embodiments, the timing accuracy may be determined to be the second timing accuracy if the timing-based positioning method is used in the positioning measurements on the reference signal. Additionally, the plurality of timing accuracies may further include (iii) a third timing accuracy associated with the timing-based positioning method (e.g., the same or a different low timing accuracy). The third timing accuracy may allow a larger timing error limit than the second timing accuracy and may be the same as or different than the first timing accuracy. In this additional example, the timing accuracy may be determined to be the third timing accuracy based on at least one of: configuration information transmitted to the UE and indicating a use of the third timing accuracy, capabilities information received from the UE and indicating support by the UE of the third timing accuracy, or signaling information received from the UE and indicating that the UE used the third timing accuracy. In yet another example, determining the timing accuracy may include selecting the timing accuracy from the plurality of timing accuracies. In this example, the method may further include determining a timing error limit as a requirement that corresponds to the timing accuracy, where the positioning measurements are performed based on the timing error limit. In an example, the plurality of timing accuracies may include a first timing accuracy and a second timing accuracy. The second timing accuracy may require higher accuracy (e.g., smaller timing error limit) than the first timing accuracy Means for performing the functionality at the operation 1004 of the method may comprise software and/or hardware components of the network resource, such as the bus 1205, processing unit(s) 1210, DSP 1120, wireless communication interface 1230, memory 1260, and/or other components of the network resource 1200 illustrated in FIG. 12 and described in more detail below.

The flow 1000 also includes operation 1006, where the network resource performs the positioning measurements on the reference signal based on the timing accuracy. In the example where the timing accuracy is selected from the plurality of timing accuracies, the network resource may also determine a timing error limit as a requirement that corresponds to the timing accuracy. The measurements are performed based on the timing error limit.

Means for performing the functionality at operation 1006 of the method may comprise software and/or hardware components of the network resource, such as the bus 1205, processing unit(s) 1210, DSP 1120, wireless communication interface 1230, memory 1260, and/or other components of the network resource 1200 illustrated in FIG. 12 and described in more detail below.

In an example, the method illustrated in part in flow 1000 can also include the network resource receiving, from the UE, capabilities information indicating that the UE supports at least the timing accuracy. In such embodiments, the capabilities information may be received prior to the UE being in the power saving state.

In an example, the method illustrated in part in flow 1000 can also include the network resource transmitting, to the UE and prior to the UE being in the power saving state, configuration information indicating a use of at least the timing accuracy. In such embodiments, the configuration information may indicate the use per BWP. Furthermore, according to some embodiments, the configuration information may indicate the use at least per component carrier or band. Additionally or alternatively, the reference signal may comprise an uplink SRS for positioning, and the configuration information may indicate the use at least per SRS resource or SRS resource set.

In an example, the method illustrated in part in flow 1000 may also include the network resource receiving, from the UE, capabilities information indicating that the UE supports the plurality of timing accuracies and transmitting, to the UE and based on the capabilities information, configuration information indicating a use of at least the timing accuracy from the plurality of timing accuracies.

In an example, the method illustrated in part in flow 1000 can also include the network resource receiving, from the UE, signaling information indicating the timing accuracy that the UE used to track timing of transmission of the reference signal. The timing accuracy is signaled after the reference signal is transmitted by the UE and while the UE is no longer in the power saving state.

Means for performing the functionality at the above additional operations of the method may comprise software and/or hardware components of the network resource, such as the bus 1205, processing unit(s) 1210, DSP 1120, wireless communication interface 1230, memory 1260, and/or other components of the network resource 1200 illustrated in FIG. 12 and described in more detail below.

Figure 11:
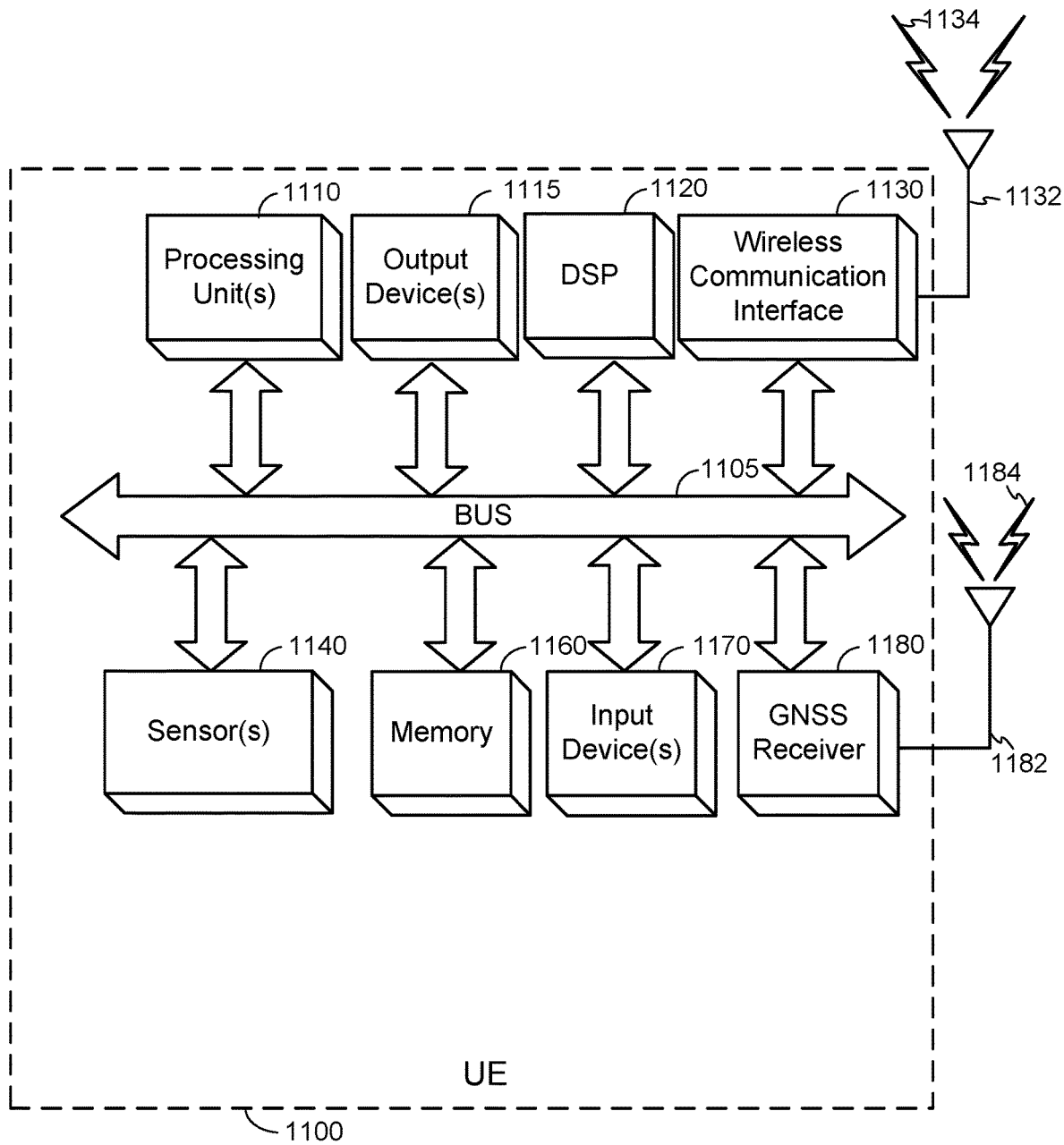
FIG. 11 is a block diagram of an embodiment of a UE, which can be utilized as described in the embodiments described herein and in association with FIGS. 1-10.

FIG. 11 is a block diagram of an embodiment of a UE 1100, which can be utilized as described in the embodiments described herein and in association with FIGS. 1-10. The UE is an example of the UE 410 described herein above. It should be noted that FIG. 11 is meant only to provide a generalized illustration of various components of UE 1100, any or all of which may be utilized as appropriate. In other words, because UEs can vary widely in functionality, they may include only a portion of the components shown in FIG. 11. It can be noted that, in some instances, components illustrated by FIG. 11 can be localized to a single physical device and/or distributed among various networked devices, which may be disposed at different physical locations.

The UE 1100 is shown comprising hardware elements that can be electrically coupled via a bus 1105 (or may otherwise be in communication, as appropriate). The hardware elements may include a processing unit(s) 1110 which may comprise without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 11, some embodiments may have a separate DSP 1120, depending on desired functionality. The UE 1100 also may comprise one or more input devices 1170, which may comprise, without limitation, one or more touch screens, touch pads, microphones, buttons, dials, switches, and/or the like; and one or more output devices 1115, which may comprise, without limitation, one or more displays, light emitting diodes (LEDs), speakers, and/or the like.

The UE 1100 might also include a wireless communication interface 1130, which may comprise, without limitation, a modem, a network card, an infrared communication device, a wireless communication device, and/or a chipset (such as a Bluetooth® device, an IEEE 802.11 device, an IEEE 802.15.4 device, a Wi-Fi device, a WiMAX™ device, cellular communication facilities, etc.), and/or the like, which may enable the UE 1100 to communicate via the networks described herein with regard to FIGS. 1-10. The wireless communication interface 1130 may permit data to be communicated with a network, eNBs, ng-eNBs, gNBs, and/or other network components, computer systems, and/or any other electronic devices described herein. The communication can be carried out via one or more wireless communication antenna(s) 1132 that send and/or receive wireless signals 1134. According to some embodiments, the wireless communication antenna(s) 1132 may comprise a plurality of discrete antennas, antenna arrays, or any combination thereof. The antenna(s) 1132 may be capable of transmitting and receiving wireless signals using beams (e.g., Tx beams and Rx beams). Beam formation may be performed using digital and/or analog beam formation techniques, with respective digital and/or analog circuitry. The wireless communication interface 1130 may include such circuitry.

Depending on desired functionality, the wireless communication interface 1130 may comprise separate transceivers to communicate with base stations (e.g., eNBs, ng-eNBs, and/or gNBs) and other terrestrial transceivers, such as wireless devices and access points. The UE 1100 may communicate with different data networks that may comprise various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as CDMA2000, Wideband-CDMA (WCDMA), and so on. CDMA2000 includes IS-95, IS-2000, and/or IS-856 standards. A TDMA network may implement GSM, Digital Advanced Mobile Phone System (D-AMPS), or some other RAT. An OFDMA network may employ LTE, LTE Advanced, NR and so on. 5G, LTE, LTE Advanced, NR, GSM, and WCDMA are described in documents from 3GPP. CDMA2000 is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN, and/or WPAN.

The UE 1100 can further include sensor(s) 1140. Such sensors may comprise, without limitation, one or more inertial sensors (e.g., accelerometer(s), gyroscope(s), and or other Inertial Measurement Units (IMUs)), camera(s), magnetometer(s), a compass, altimeter(s), microphone(s), proximity sensor(s), light sensor(s), a barometer, and the like, some of which may be used to complement and/or facilitate the functionality described herein.

Embodiments of the UE 1100 may also include a GNSS receiver 1180 capable of receiving signals 1184 from one or more GNSS satellites (e.g., SVs 190) using an GNSS antenna 1182 (which may be combined in some implementations with antenna(s) 1132). Such positioning can be utilized to complement and/or incorporate the techniques described herein. The GNSS receiver 1180 can extract a position of the UE 1100, using conventional techniques, from GNSS SVs (e.g., SVs 190) of a GNSS system, such as GPS, Galileo, GLONASS, Compass, Quasi-Zenith Satellite System (QZSS) over Japan, Indian Regional Navigational Satellite System (IRNSS) over India, Beidou over China, and/or the like. Moreover, the GNSS receiver 1180 can use various augmentation systems (e.g., a Satellite Based Augmentation System (SBAS)) that may be associated with, or otherwise enabled for use with, one or more global and/or regional navigation satellite systems. By way of example but not limitation, an SBAS may include an augmentation system(s) that provides integrity information, differential corrections, etc. (e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like).

It can be noted that, although GNSS receiver 980 is illustrated in FIG. 9 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processing units, such as processing unit(s) 910, DSP 920, and/or a processing unit within the wireless communication interface 930 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processing units, such as processing unit(s) 910 or DSP 920.

The UE 1100 may further include and/or be in communication with a memory 1160. The memory 1160 may comprise, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 1160 of the UE 1100 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above might be implemented as code and/or instructions executable by the UE 1100 (e.g., using processing unit(s) 1110). In an aspect, then such code and/or instructions can be used to configure and/or adapt a general purpose computer (or other device) to perform one or more operations in accordance with the described methods.

Figure 12:
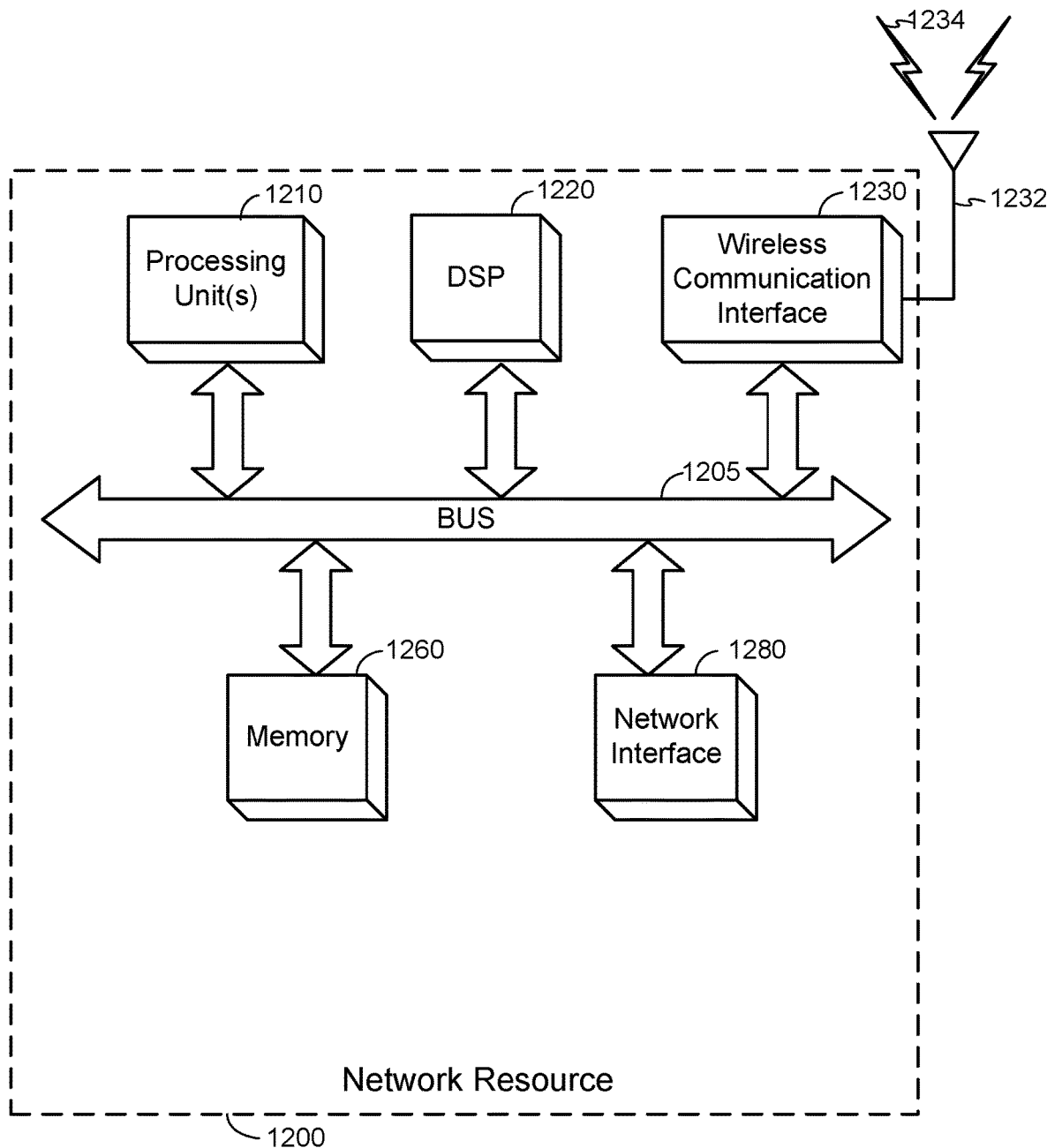
FIG. 12 illustrates an embodiment of a network resource, which can be utilized as described herein above (e.g., in association with FIGS. 1-10.

FIG. 12 illustrates an embodiment of a network resource 1200, which can be utilized as described herein above in association with FIGS. 1-10. The network resource 1200 can correspond to the network resource 450 and its components can be used to implement a location server, and/or a base station. It should be noted that FIG. 12 is meant only to provide a generalized illustration of various components, any or all of which may be utilized as appropriate.

The network resource 1200 is shown comprising hardware elements that can be electrically coupled via a bus 1205 (or may otherwise be in communication, as appropriate). The hardware elements may include a processing unit(s) 1210 which can include without limitation one or more general-purpose processors, one or more special-purpose processors (such as DSP chips, graphics acceleration processors, ASICs, and/or the like), and/or other processing structure or means. As shown in FIG. 12, some embodiments may have a separate DSP 1220, depending on desired functionality. Location determination and/or other determinations based on wireless communication may be provided in the processing unit(s) 1210 and/or wireless communication interface 1230 (discussed below), according to some embodiments. The network resource 1200 also can include one or more input devices, which can include, without limitation, a keyboard, display, mouse, microphone, button(s), dial(s), switch(es), and/or the like; and one or more output devices, which can include, without limitation, a display, light emitting diode (LED), speakers, and/or the like.

The network resource 1200 might also include a wireless communication interface 1230, which may comprise, without limitation, a modem, a network card, an infrared communication device, a wireless communication device, and/or a chipset (such as a Bluetooth® device, an IEEE 802.11 device, an IEEE 802.15.4 device, a WiFi device, a WiMAX device, cellular communication facilities, etc.), and/or the like, which may enable the network resource 1200 to communicate as described herein. The wireless communication interface 1230 may permit data and signaling to be communicated (e.g., transmitted and received) to UEs, base stations (e.g., eNBs, gNBs, and ng-eNBs), and/or other network components, computer systems, and/or any other electronic devices described herein. The communication can be carried out via one or more wireless communication antenna(s) 1232 that send and/or receive wireless signals 1234.

The network resource 1200 may also include a network interface 1280, which can include support of wireline communication technologies. The network interface 1280 may include a modem, network card, chipset, and/or the like. The network interface 1280 may include one or more input and/or output communication interfaces to permit data to be exchanged with a network, communication network servers, computer systems, and/or any other electronic devices described herein.

In many embodiments, the network resource 1200 will further comprise a memory 1260. The memory 1260 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1260 of the network resource 1200 also can comprise software elements (not shown in FIG. 12), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1260 that are executable by the network resource 1200 (and/or processing unit(s) 1210 or DSP 1220 within network resource 1200). In an aspect, then such code and/or instructions can be used to configure and/or adapt a general purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms "and" and "or" as used herein may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method for transmitting a reference signal for positioning a user equipment (UE) in a power saving state corresponding to a discontinuous reception (DRX), radio resource control (RRC)-idle, or RRC-inactive state, the method comprising: entering into the power saving state by the UE; determining, at the UE, a timing accuracy associated with a transmission timing of the reference signal during the power saving state of the UE, the timing accuracy determined from a plurality of timing accuracies based on: a positioning method, a type of positioning measurements to be determined from the reference signal, or a configuration received by a network resource, or a combination thereof; determining, at the UE, during the power saving state, the transmission timing based on the timing accuracy; and transmitting, by the UE during the power saving state, the reference signal based on the transmission timing.

Clause 2. The method of clause 1, wherein the plurality of timing accuracies comprises: (i) a first timing accuracy associated with an angular-based positioning method, and (ii) a second timing accuracy associated with a timing-based positioning method, wherein the second timing accuracy requires a lower-timing error limit than the first timing accuracy.

Clause 3. The method of clause 2, wherein the plurality of timing accuracies further comprises: (iii) a third timing accuracy associated with the timing-based positioning method, wherein the third timing accuracy allows a larger timing error limit than the second timing accuracy and is the same as or different than the first timing accuracy.

Clause 4. The method of any of clauses 1-3, wherein the method further comprises transmitting, to the network resource, capabilities information indicating that the UE supports transmission of a reference signal for positioning transmissions with at least the timing accuracy.

Clause 5. The method of clause 4, wherein the capabilities information is transmitted prior to the UE being in the power saving state.

Clause 6. The method of any of clauses 1-5 further comprising, receiving, from the network resource and prior to the UE being in the power saving state, configuration information indicating a use of at least the timing accuracy.

Clause 7. The method of clause 6, wherein the configuration information indicates the use per bandwidth part (BWP).

Clause 8. The method of any of clauses 6-7, wherein the configuration information indicates the use at least per component carrier or band.

Clause 9. The method of any of clauses 6-8, wherein the reference signal is an uplink sounding reference signal (SRS) for positioning purposes, and wherein the configuration information indicates the use at least per SRS resource or SRS resource set.

Clause 10. The method of any of clauses 1-9 further comprising transmitting, to the network resource, capabilities information indicating that the UE supports transmission of a reference signal for positioning transmission with the plurality of timing accuracies; and receiving, from the network resource, configuration information indicating a use of at least the timing accuracy from the plurality of timing accuracies, wherein the timing accuracy is further determined based on the configuration information.

Clause 11. The method of any of clauses 1-10 further comprising, signaling, to the network resource, the timing accuracy used in the determining of the transmission timing.

Clause 12. The method of clause 11, wherein the timing accuracy is signaled after the transmitting of the reference signal.

Clause 13. The method of clause 12, wherein the timing accuracy is signaled while the UE is no longer in the power saving state.

Clause 14. The method of any of clauses 1-13, wherein the plurality of timing accuracies comprises a first timing accuracy and a second timing accuracy, wherein the second timing accuracy requires higher accuracy than the first timing accuracy.

Clause 15. The method of clause 14, wherein the UE is configured to maintain, relative to the first timing accuracy, an additional component active during the power saving state in support of the second timing accuracy.

Clause 16. The method of any of clauses 14-15, wherein the UE is configured to maintain, relative to the first timing accuracy, a clock of the UE at a higher speed in support of the second timing accuracy.

Clause 17. The method of any of clauses 14-16, wherein the reference signal is an uplink sounding reference signal (SRS) for positioning.

Clause 18. A method for supporting positioning a user equipment (UE) in a power state corresponding to a discontinuous reception (DRX), radio resource control (RRC)-idle, or RRC-inactive state by a network resource, the method comprising: receiving, at the network resource, a reference signal for positioning the UE, the reference signal transmitted by the UE while the UE is in the power saving state; determining, at the network resource, a timing accuracy associated with the reference signal, the timing accuracy determined from a plurality of timing accuracies based on: a positioning method, a type of positioning measurements to be determined from the reference signal, or a configuration received by the network resource, or a combination thereof; and performing, by the network resource, a positioning measurement on the reference signal based on the timing accuracy.

Clause 19. The method of clause 18, wherein the plurality of timing accuracies comprises: (i) a first timing accuracy associated with an angular-based positioning method, and (ii) a second timing accuracy associated with a timing-based positioning method, wherein the second timing accuracy requires a lower timing error limit than the first timing accuracy.

Clause 20. The method of clause 19, wherein the timing accuracy is determined to be the first timing accuracy if the angular-based positioning method is used in the positioning measurement on the reference signal, and wherein the timing accuracy is determined to be the second timing accuracy if the timing-based positioning method is used in the positioning measurement on the reference signal.

Clause 21. The method of clause 19, wherein the plurality of timing accuracies further comprises: (iii) a third timing accuracy associated with the timing-based positioning method, wherein the third timing accuracy allows a larger timing error limit than the second timing accuracy and is the same as or different than the first timing accuracy.

Clause 22. The method of clause 21, wherein the timing accuracy is determined to be the third timing accuracy based on at least one of: configuration information transmitted to the UE and indicating a use of the third timing accuracy, capabilities information received from the UE and indicating support by the UE of the third timing accuracy, or signaling information received from the UE and indicating that the UE used the third timing accuracy.

Clause 23. The method of clause 18, wherein determining the timing accuracy comprises selecting the timing accuracy from the plurality of timing accuracies, wherein the method further comprises determining a timing error limit as a requirement that corresponds to the timing accuracy, and wherein the positioning measurement is performed based on the timing error limit.

Clause 24. The method of any of clauses 18-23 further comprising, receiving, from the UE, capabilities information indicating that the UE supports at least the timing accuracy.

Clause 25. The method of clause 24, wherein the capabilities information is received prior to the UE being in the power saving state.

Clause 26. The method of any of clauses 18-25 further comprising, transmitting, to the UE and prior to the UE being in the power saving state, configuration information indicating a use of at least the timing accuracy.

Clause 27. The method of clause 26, wherein the configuration information indicates the use per bandwidth part (BWP).

Clause 28. The method of any of clauses 26-27, wherein the configuration information indicates the use at least per component carrier or band.

Clause 29. The method of any of clauses 28-28, wherein the reference signal is an uplink sounding reference signal (SRS) for positioning, and wherein the configuration information indicates the use at least per SRS resource or SRS resource set.

Clause 30. The method of any of clauses 18-29 further comprising receiving, from the UE, capabilities information indicating that the UE supports the plurality of timing accuracies; and transmitting, to the UE and based on the capabilities information, configuration information indicating a use of at least the timing accuracy from the plurality of timing accuracies.

Clause 31. The method of any of clauses 18-30 further comprising receiving, from the UE, signaling information indicating the timing accuracy that the UE used to track timing of transmission of the reference signal.

Clause 32. The method of any of clauses 18-31, wherein the timing accuracy is signaled after the reference signal is transmitted by the UE and while the UE is no longer in the power saving state.

Clause 33. The method of any of clauses 18-32, wherein the plurality of timing accuracies comprises a first timing accuracy and a second timing accuracy, wherein the second timing accuracy requires higher accuracy than the first timing accuracy.

Clause 34. The method of any of clauses 18-33, wherein the reference signal is an uplink sounding reference signal (SRS) for positioning, and wherein the power saving state corresponds to a discontinuous reception (DRX)-inactive state, a radio resource control (RRC)-idle state, or an RRC-inactive state.

Clause 35. A user equipment (UE) for transmitting a reference signal for positioning the UE in a power saving state corresponding to a discontinuous reception (DRX), radio resource control (RRC)-idle, or RRC-inactive state, the UE comprising a transceiver, a memory, and one or more processors communicatively coupled with the transceiver and the memory. The one or more processors are configured to perform the method of any of clauses 1-18.

Clause 36. A network resource for supporting positioning a user equipment (UE) in a power state corresponding to a discontinuous reception (DRX), radio resource control (RRC)-idle, or RRC-inactive state, the network resource comprising a transceiver, a memory, and one or more processors communicatively coupled with the transceiver and the memory. The one or more processors are configured to perform the method of any of clauses 18-33.

Clause 37. A device comprising means for performing the method of any of clauses 1-33.

Clause 38. A non-transitory computer-readable medium storing instructions for transmitting a reference signal for positioning a user equipment (UE) in a power state corresponding to a discontinuous reception (DRX), radio resource control (RRC)-idle, or RRC-inactive state, the instructions comprising code for performing the method of any of clauses 1-33.

What is claimed is:

1. A method for transmitting a reference signal for positioning a user equipment (UE) in a power saving state corresponding to a discontinuous reception (DRX), radio resource control (RRC)-idle, or RRC-inactive state, the method comprising:
   entering into the power saving state by the UE;
   determining, at the UE, a timing accuracy associated with a transmission timing of the reference signal during the power saving state of the UE, the timing accuracy determined from a plurality of timing accuracies based on:
      a positioning method,
      a type of positioning measurements to be determined from the reference signal, or
      a configuration received by a network resource, or
      a combination thereof;
   determining, at the UE, during the power saving state, the transmission timing based on the timing accuracy; and
   transmitting, by the UE during the power saving state, the reference signal based on the transmission timing.

2. The method of claim 1, wherein the plurality of timing accuracies comprises: (i) a first timing accuracy associated with an angular-based positioning method, and (ii) a second timing accuracy associated with a timing-based positioning method, wherein the second timing accuracy requires a lower-timing error limit than the first timing accuracy.

3. The method of claim 2, wherein the plurality of timing accuracies further comprises: (iii) a third timing accuracy associated with the timing-based positioning method, wherein the third timing accuracy allows a larger timing error limit than the second timing accuracy and is the same as or different than the first timing accuracy.

4. The method of claim 1, wherein the method further comprises transmitting, to the network resource, capabilities information indicating that the UE supports transmission of a reference signal for positioning transmissions with at least the timing accuracy.

5. The method of claim 4, wherein the capabilities information is transmitted prior to the UE being in the power saving state.

6. The method of claim 1, further comprising receiving, from the network resource and prior to the UE being in the power saving state, configuration information indicating a use of at least the timing accuracy.

7. The method of claim 6, wherein the configuration information indicates the use per bandwidth part (BWP).

8. The method of claim 6, wherein the configuration information indicates the use at least per component carrier or band.

9. The method of claim 6, wherein the reference signal is an uplink sounding reference signal (SRS) for positioning purposes, and wherein the configuration information indicates the use at least per SRS resource or SRS resource set.

10. The method of claim 1, further comprising:
   transmitting, to the network resource, capabilities information indicating that the UE supports transmission of a reference signal for positioning transmission with the plurality of timing accuracies; and
   receiving, from the network resource, configuration information indicating a use of at least the timing accuracy from the plurality of timing accuracies, wherein the timing accuracy is further determined based on the configuration information.

11. The method of claim 1, further comprising signaling, to the network resource, the timing accuracy used in the determining of the transmission timing.

12. The method of claim 11, wherein the timing accuracy is signaled after the transmitting of the reference signal.

13. The method of claim 12, wherein the timing accuracy is signaled while the UE is no longer in the power saving state.

14. The method of claim 1, wherein the plurality of timing accuracies comprises a first timing accuracy and a second timing accuracy, wherein the second timing accuracy requires higher accuracy than the first timing accuracy.

15. The method of claim 14, wherein the UE is configured to maintain, relative to the first timing accuracy, an additional component active during the power saving state in support of the second timing accuracy.

16. The method of claim 14, wherein the UE is configured to maintain, relative to the first timing accuracy, a clock of the UE at a higher speed in support of the second timing accuracy.

17. The method of claim 1, wherein the reference signal is an uplink sounding reference signal (SRS) for positioning.

18. A method for supporting positioning a user equipment (UE) in a power saving state corresponding to a discontinuous reception (DRX), radio resource control (RRC)-idle, or RRC-inactive state by a network resource, the method comprising:
   receiving, at the network resource, a reference signal for positioning the UE, the reference signal transmitted by the UE while the UE is in the power saving state;

determining, at the network resource, a timing accuracy associated with the reference signal, the timing accuracy determined from a plurality of timing accuracies based on:
- a positioning method,
- a type of positioning measurements to be determined from the reference signal, or
- a configuration received by the network resource, or
- a combination thereof, and performing, by the network resource, a positioning measurement on the reference signal based on the timing accuracy.

19. The method of claim 18, wherein the plurality of timing accuracies comprises: (i) a first timing accuracy associated with an angular-based positioning method, and (ii) a second timing accuracy associated with a timing-based positioning method, wherein the second timing accuracy requires a lower timing error limit than the first timing accuracy.

20. The method of claim 19, wherein the timing accuracy is determined to be the first timing accuracy if the angular-based positioning method is used in the positioning measurement on the reference signal, and wherein the timing accuracy is determined to be the second timing accuracy if the timing-based positioning method is used in the positioning measurement on the reference signal.

21. The method of claim 19, wherein the plurality of timing accuracies further comprises: (iii) a third timing accuracy associated with the timing-based positioning method, wherein the third timing accuracy allows a larger timing error limit than the second timing accuracy and is the same as or different than the first timing accuracy.

22. The method of claim 21, wherein the timing accuracy is determined to be the third timing accuracy based on at least one of: configuration information transmitted to the UE and indicating a use of the third timing accuracy, capabilities information received from the UE and indicating support by the UE of the third timing accuracy, or signaling information received from the UE and indicating that the UE used the third timing accuracy.

23. The method of claim 18, wherein determining the timing accuracy comprises selecting the timing accuracy from the plurality of timing accuracies, wherein the method further comprises determining a timing error limit as a requirement that corresponds to the timing accuracy, and wherein the positioning measurement is performed based on the timing error limit.

24. The method of claim 18, further comprising receiving, from the UE, capabilities information indicating that the UE supports at least the timing accuracy.

25. The method of claim 24, wherein the capabilities information is received prior to the UE being in the power saving state.

26. The method of claim 18, further comprising transmitting, to the UE and prior to the UE being in the power saving state, configuration information indicating a use of at least the timing accuracy.

27. The method of claim 26, wherein the configuration information indicates the use per bandwidth part (BWP).

28. The method of claim 26, wherein the configuration information indicates the use at least per component carrier or band.

29. The method of claim 26, wherein the reference signal is an uplink sounding reference signal (SRS) for positioning, and wherein the configuration information indicates the use at least per SRS resource or SRS resource set.

30. The method of claim 18, further comprising:
receiving, from the UE, capabilities information indicating that the UE supports the plurality of timing accuracies; and
transmitting, to the UE and based on the capabilities information, configuration information indicating a use of at least the timing accuracy from the plurality of timing accuracies.

31. The method of claim 18, further comprising:
receiving, from the UE, signaling information indicating the timing accuracy that the UE used to track timing of transmission of the reference signal.

32. The method of claim 31, wherein the timing accuracy is signaled after the reference signal is transmitted by the UE and while the UE is no longer in the power saving state.

33. The method of claim 18, wherein the plurality of timing accuracies comprises a first timing accuracy and a second timing accuracy, wherein the second timing accuracy requires higher accuracy than the first timing accuracy.

34. The method of claim 18, wherein the reference signal is an uplink sounding reference signal (SRS) for positioning, and wherein the power saving state corresponds to a discontinuous reception (DRX)-inactive state, a radio resource control (RRC)-idle state, or an RRC-inactive state.

35. A user equipment (UE) for transmitting a reference signal for positioning the UE in a power saving state corresponding to a discontinuous reception (DRX), radio resource control (RRC)-idle, or RRC-inactive state, the UE comprising:
a transceiver;
a memory; and
one or more processors communicatively coupled with the transceiver and the memory, wherein the one or more processors are configured to:
enter the UE into the power saving state;
determine a timing accuracy associated with a transmission timing of the reference signal during the power saving state of the UE, the timing accuracy determined from a plurality of timing accuracies based on:
a positioning method,
a type of positioning measurements to be determined from the reference signal, or
a configuration received by a network resource, or
a combination thereof;
determine, at the UE, during the power saving state, the transmission timing based on the timing accuracy; and
transmit, via the transceiver, the reference signal based on the transmission timing.

36. The UE of claim 35, wherein the one or more processors are further configured to receive, from the network resource and prior to the UE being in the power saving state, configuration information indicating a use of at least the timing accuracy.

37. The UE of claim 36, wherein the reference signal is an uplink sounding reference signal (SRS) for positioning purposes, and wherein the configuration information indicates the use at least per SRS resource or SRS resource set.

38. The UE of claim 35, wherein the one or more processors are further configured to:
transmit, to a network resource, capabilities information indicating that the UE supports transmission of a reference signal for positioning transmission with the plurality of timing accuracies; and
receive, from the network resource, configuration information indicating a use of at least the timing accuracy from the plurality of timing accuracies, wherein the timing accuracy is further determined based on the configuration information.

39. The UE of claim 35, wherein the one or more processors are further configured to signal, to the network resource, the timing accuracy used in the determining of the transmission timing.

40. The UE of claim 35, wherein the plurality of timing accuracies comprises a first timing accuracy and a second timing accuracy, wherein the second timing accuracy requires higher accuracy than the first timing accuracy.

41. The UE of claim 40, wherein the UE is configured to maintain, relative to the first timing accuracy, an additional component active during the power saving state in support of the second timing accuracy.

42. The UE of claim 40, wherein the UE is configured to maintain, relative to the first timing accuracy, a clock of the UE at a higher speed in support of the second timing accuracy.

43. The UE of claim 35, wherein the reference signal is an uplink sounding reference signal (SRS) for positioning.

44. A network resource for supporting positioning a user equipment (UE) in a power saving state corresponding to a discontinuous reception (DRX), radio resource control (RRC)-idle, or RRC-inactive state, the network resource comprising:
a transceiver;
a memory; and
one or more processors communicatively coupled with the transceiver and the memory, wherein the one or more processors are configured to:
receive, at the network resource, a reference signal for positioning the UE, the reference signal transmitted by the UE while the UE is in the power saving state;
determine, at the network resource, a timing accuracy associated with the reference signal, the timing accuracy determined from a plurality of timing accuracies based on:
a positioning method,
a type of positioning measurements to be determined from the reference signal, or
a configuration received by the network resource, or
a combination thereof, and
perform a positioning measurement on the reference signal based on the timing accuracy.

45. The network resource of claim 44, wherein, to determine the timing accuracy, the one or more processors are configured to select the timing accuracy from the plurality of timing accuracies, wherein the one or more processors are further configured to determine a timing error limit as a requirement that corresponds to the timing accuracy, and wherein the positioning measurement is performed based on the timing error limit.

46. The network resource of claim 44, wherein the one or more processors are further configured to receive, from the UE, capabilities information indicating that the UE supports at least the timing accuracy.

47. The network resource of claim 44, wherein the one or more processors are further configured to transmit, to the UE and prior to the UE being in the power saving state, configuration information indicating a use of at least the timing accuracy.

48. The network resource of claim 47, wherein the configuration information indicates the use per bandwidth part (BWP).

49. The network resource of claim 47, wherein the configuration information indicates the use at least per component carrier or band.

50. The network resource of claim 44, wherein the one or more processors are further configured to:
receive, from the UE, capabilities information indicating that the UE supports the plurality of timing accuracies; and
transmit, to the UE and based on the capabilities information, configuration information indicating a use of at least the timing accuracy from the plurality of timing accuracies.

51. The network resource of claim 44, wherein the one or more processors are further configured to receive, from the UE, signaling information indicating the timing accuracy that the UE used to track timing of transmission of the reference signal.

* * * * *